United States Patent
Mahkonen et al.

(10) Patent No.: US 11,218,840 B2
(45) Date of Patent: Jan. 4, 2022

(54) METHODS AND SYSTEMS FOR USING NETWORK LOCATION SERVICES IN A UNMANNED AIRCRAFT SYSTEMS TRAFFIC MANAGEMENT FRAMEWORK

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 16/499,190

(22) PCT Filed: Jun. 20, 2017

(86) PCT No.: PCT/IB2017/053641
§ 371 (c)(1),
(2) Date: Sep. 27, 2019

(87) PCT Pub. No.: WO2018/178752
PCT Pub. Date: Oct. 4, 2018

(65) Prior Publication Data
US 2021/0274311 A1 Sep. 2, 2021

Related U.S. Application Data

(60) Provisional application No. 62/480,222, filed on Mar. 31, 2017.

(51) Int. Cl.
*H04W 4/00* (2018.01)
*H04W 4/029* (2018.01)
(Continued)

(52) U.S. Cl.
CPC .......... *H04W 4/029* (2018.02); *B64C 39/024* (2013.01); *G08G 5/0069* (2013.01); *H04W 4/021* (2013.01); *B64C 2201/146* (2013.01)

(58) Field of Classification Search
CPC ...... H04W 4/029; H04W 4/21; B64C 39/024; B64C 2201/146; G08G 5/0069
See application file for complete search history.

(56) References Cited

U.S. PATENT DOCUMENTS 7,813,326 B1 10/2010 Kelm et al.
9,363,690 B1 6/2016 Singh et al.
(Continued)

FOREIGN PATENT DOCUMENTS

CN 101836478 A 9/2010
CN 104053195 A 9/2014
(Continued)

OTHER PUBLICATIONS

Office Action, TW App. No. 107115169, dated Apr. 22, 2019, 9 pages (2 pages of Partial English Translation and 7 pages of Original Document).

(Continued)

*Primary Examiner* — Khai M Nguyen
(74) *Attorney, Agent, or Firm* — NDWE LLP

(57) ABSTRACT

A method for managing an unmanned aerial vehicle (UAV) is described. The method may include transmitting a request to monitor a location of the UAV to a location services system provided by a network operator that provides location information of the UAV based on wireless communications of the UAV in a network operated by the network operator, wherein the request to monitor the location of the UAV indicates an area of interest; receiving, from the location services system, a message that indicates a current location of the UAV as a result of the location services (Continued)

system detecting the UAV in the area of interest; and causing one or more remedial actions to be performed responsive to receipt of the message.

18 Claims, 13 Drawing Sheets

(51) Int. Cl.
*B64C 39/02* (2006.01)
*G08G 5/00* (2006.01)
*H04W 4/021* (2018.01)

(56) References Cited

U.S. PATENT DOCUMENTS

| | | | |
|---|---|---|---|
| 9,412,278 B1* | 8/2016 | Gong | G08G 5/0052 |
| 9,467,922 B1 | 10/2016 | Buchmueller et al. | |
| 9,537,561 B1 | 1/2017 | Kotecha et al. | |
| 9,576,493 B2* | 2/2017 | Jarrell | G08G 5/0043 |
| 9,588,516 B1 | 3/2017 | Gurel et al. | |
| 9,609,288 B1 | 3/2017 | Richman et al. | |
| 9,709,409 B2 | 7/2017 | Dave et al. | |
| 2004/0156399 A1 | 8/2004 | Eran | |
| 2007/0284474 A1 | 12/2007 | Olson et al. | |
| 2010/0062774 A1 | 3/2010 | Motegi et al. | |
| 2010/0085236 A1 | 4/2010 | Franceschini et al. | |
| 2010/0153001 A1 | 6/2010 | Bauchot et al. | |
| 2010/0254346 A1 | 10/2010 | Jain et al. | |
| 2012/0225675 A1 | 9/2012 | Nishida et al. | |
| 2015/0038140 A1 | 2/2015 | Kilpatrick et al. | |
| 2015/0119043 A1 | 4/2015 | Gopal et al. | |
| 2015/0208300 A1 | 7/2015 | Mclaughlin et al. | |
| 2015/0312813 A1 | 10/2015 | Xu et al. | |
| 2015/0336667 A1* | 11/2015 | Srivastava | B64C 39/024 |
| | | | 701/2 |
| 2016/0065345 A1 | 3/2016 | Kim et al. | |
| 2016/0070265 A1 | 3/2016 | Liu et al. | |
| 2016/0125740 A1* | 5/2016 | Pasko | G08G 5/0039 |
| | | | 701/528 |
| 2016/0140851 A1 | 5/2016 | Levy et al. | |
| 2016/0142944 A1 | 5/2016 | Cao | |
| 2016/0142994 A1 | 5/2016 | Luo et al. | |
| 2016/0161258 A1 | 6/2016 | Magson et al. | |
| 2016/0266579 A1 | 9/2016 | Chen et al. | |
| 2016/0284221 A1 | 9/2016 | Hinkle et al. | |
| 2016/0292403 A1 | 10/2016 | Gong et al. | |
| 2016/0300493 A1 | 10/2016 | Ubhi et al. | |
| 2016/0300495 A1 | 10/2016 | Kantor et al. | |
| 2016/0358187 A1 | 12/2016 | Radocchia et al. | |
| 2016/0363929 A1 | 12/2016 | Clark et al. | |
| 2016/0371985 A1 | 12/2016 | Kotecha | |
| 2016/0371987 A1 | 12/2016 | Kotecha | |
| 2016/0380692 A1 | 12/2016 | Jalali et al. | |
| 2017/0023939 A1 | 1/2017 | Leonard et al. | |
| 2017/0045884 A1 | 2/2017 | Kablaoui | |
| 2017/0069214 A1* | 3/2017 | Dupray | G08G 5/0013 |
| 2017/0092137 A1 | 3/2017 | Hiebl | |
| 2017/0124884 A1 | 5/2017 | Shaw et al. | |
| 2017/0142766 A1 | 5/2017 | Kim | |
| 2017/0148332 A1* | 5/2017 | Ziemba | G08G 5/0039 |
| 2017/0150373 A1 | 5/2017 | Brennan et al. | |
| 2017/0168480 A1 | 6/2017 | Wanstedt et al. | |
| 2017/0245114 A1* | 8/2017 | Bessho | H04W 4/027 |
| 2018/0086483 A1 | 3/2018 | Priest et al. | |
| 2018/0152510 A1 | 5/2018 | Newton et al. | |
| 2018/0247544 A1 | 8/2018 | Mustafic et al. | |
| 2018/0279348 A1 | 9/2018 | Huang et al. | |
| 2019/0012923 A1 | 1/2019 | Weisbrod et al. | |
| 2019/0087576 A1 | 3/2019 | Olson | |
| 2019/0289505 A1 | 9/2019 | Thomas et al. | |
| 2019/0364492 A1 | 11/2019 | Azizi et al. | |
| 2020/0005651 A1 | 1/2020 | Priest | |
| 2020/0105149 A1 | 4/2020 | Mahkonen et al. | |
| 2020/0193844 A1 | 6/2020 | Mahkonen et al. | |

FOREIGN PATENT DOCUMENTS

| | | |
|---|---|---|
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

Office Action, TW App. No. 107115169, dated Nov. 28, 2018, 17 pages (8 pages of English Translation and 9 pages of Original Document).
3GPP TS 23.203 V12.6.0, 3rd Generation Partnership Project, Technical Specification Group Services and System Aspects, Policy and charging control architecture, (Release 12), Sep. 2014, 220 pages.
3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, 3rd Generation Partnership Project, Technical Specification Group Services and System Aspects, Functional stage 2 description of Location Services (LCS), (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Curran et al., "Location Based Predictive Handoff Algorithm for Mobile Networks," Advances in Intelligent IT: Active Media Technology, May 2006, pp. 86-91.
Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitre.org/sites/default/files/publications/16-4497-AIAA-2017-ADS-B.pdf>, 2017, 15 pages.

(56) References Cited

OTHER PUBLICATIONS

Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.
Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
IEEE Std 802.11 (Trademark)-2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.
International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/054160, dated Mar. 13, 2018, 16 pages.
International Search Report and Written Opinion for Application No. PCT/IB2017/054252, dated Jan. 3, 2018, 11 pages.
International Search Report and Written Opinion for Application No. PCT/IB2017/057810, dated Mar. 13, 2018, 10 pages.
International Search Report and Written Opinion for Application No. PCT/IB2017/057859, dated Jun. 12, 2018, 21 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
International Search Report and Written Opinion, PCT App. No. PCT/US2017/050046, dated Dec. 13, 2017, 13 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP TSG-RAN WG2 Meeting #98, *2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPP SYNC/RAN2/Docs/.
MAVLINK Common Message set specifications, available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages.
Qualcomm, LIE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
Second Written Opinion for Application No. PCT/IB2017/054160, dated Jun. 7, 2019, 15 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Wikipedia, "Global Positioning System", available online at <https://en.wikipedia.org/w/index.php?title=Global_Positioning_System&oldid=917890871>, Sep. 26, 2019, 36 pages.
International Search Report and Written Opinion for Application No. PCT/IB2017/053641, dated Nov. 22, 2017, 11 pages.
3GPP TS 22.071 V14.1.0, "3rd Generation Partnership Project; Technical Specification Group Services and System Aspects; Location Services (LCS); Service description; Stage 1 (Release 14)," Sep. 2015, 55 pages, 3GPP Organizational Partners.

* cited by examiner

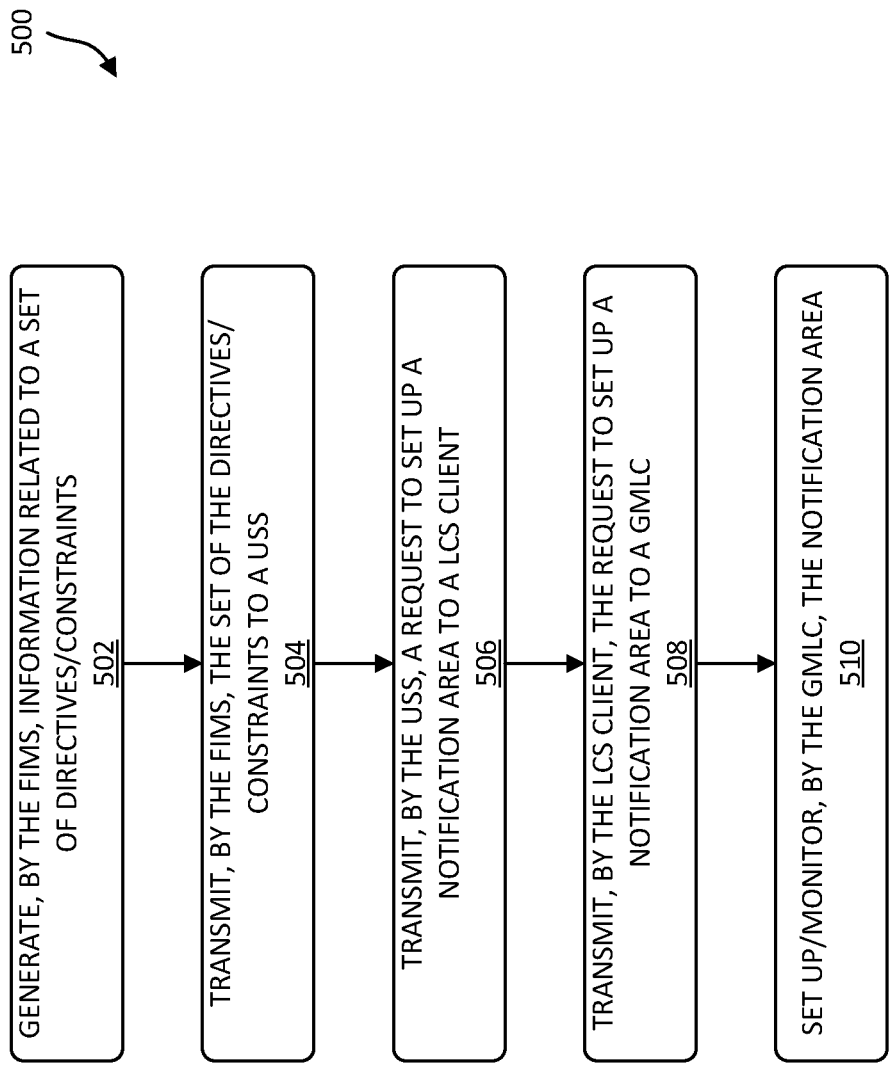

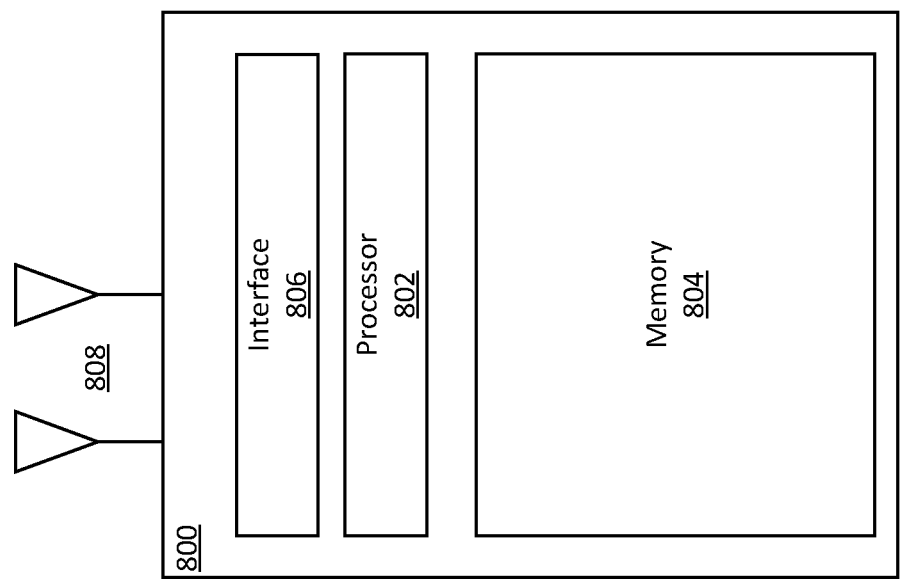

METHODS AND SYSTEMS FOR USING NETWORK LOCATION SERVICES IN A UNMANNED AIRCRAFT SYSTEMS TRAFFIC MANAGEMENT FRAMEWORK

CROSS-REFERENCE TO RELATED APPLICATIONS

This application is a national stage of International Application No. PCT/IB2017/053641, filed Jun. 20, 2017, which claims the benefit of U.S. Provisional Application No. 62/480,222, filed Mar. 31, 2017, which are hereby incorporated by reference.

FIELD

Embodiments of the invention relate to the field of managing Unmanned Aircraft Systems (UASs); and more specifically, to managing UASs in an UAS Traffic Management (UTM) framework using Location Services (LCS) provided by a wireless network.

BACKGROUND

The Federal Aviation Administration (FAA) and National Aeronautics and Space Administration (NASA) are defining an Unmanned Aircraft System Traffic Management (UTM) framework. Such a system seeks to present an effective management structure for Unmanned Aircraft System (UAS) traffic. In this vein, the UTM is sought to act as an enabler to promote widespread use of UASs in both commercial and recreational settings while at the same time minimizing the perils to manned air traffic and surrounding pieces of infrastructure.

To meet the above objectives, a UAS Service Supplier (USS) operating within the UTM may receive a set of directives and constraints. The directives and constraints may specify the current state of the managed airspace and may include restricted flight areas or other limitations to a UAS. Upon receiving a proposed UAS mission, the USS will assist in determining whether the mission is authorized to proceed and if so authorized may transmit flight path information along with other relevant information to the UAS operator.

Based on this authorization to proceed, the UAS may take flight to carry out the planned mission. However, the USS may stay involved in the flight through issuance of updated directives/constraints along with enforcement of the authorized flight plan.

To follow the progress of a UAS mission, the USS needs to collect geographical location information of the UAS. Most commonly, this information is provided by the Global Positioning System (GPS) as a flight controller in each UAS requires a GPS interface and location to carry out automated flight missions. As mentioned above, the UTM architecture provides an interface to issue directives and constraints to the UAS and a request/response interface to check if a planned mission is allowed. However, ensuring that the UAS is flying according to the details of the authorized mission requires either the UAS to periodically transmit its location or the USS to request this information. This procedure is problematic in scenarios where there are a large number of flight missions carried out simultaneously as the USS will be overwhelmed with requesting, receiving, and managing such information. In addition, enforcement of directives and constraints relies on the assumption that UAS operators and/or UASs are transmitting accurate GPS location information at all stages. However, GPS location information is often inaccurate because (1) the precision of GPS coordinates varies in different environments, (2) there are often errors in reporting coordinates (e.g., reporting coordinates from a UAS to a USS requires many hops), and/or (3) the UAS might deliberately send wrong information.

SUMMARY

A method for managing an unmanned aerial vehicle (UAV) is described herein. The method may include transmitting a request to monitor a location of the UAV to a location services system provided by a network operator that provides location information of the UAV based on wireless communications of the UAV in a network operated by the network operator, wherein the request to monitor the location of the UAV indicates an area of interest; receiving, from the location services system, a message that indicates a current location of the UAV as a result of the location services system detecting the UAV in the area of interest; and causing one or more remedial actions to be performed responsive to receipt of the message.

As described herein, a UAV Traffic Management (UTM) system may utilize location information provided by a wireless network (e.g., a 3rd Generation Partnership Project (3GPP) network). This enables the UTM system to monitor/enforce UAV locations in real time without relying on coordinate reporting from UAV operators. In this way, the UTM system does not need to provide resources to track all UAVs and the location reported for each UAV can be trusted as it is reported by a standardized, regulated, and reliable entity (e.g., the network operator of the wireless network). Accordingly, the mechanisms described herein provide a new value added service that network operators can provide the UTM system.

BRIEF DESCRIPTION OF THE DRAWINGS

The invention may best be understood by referring to the following description and accompanying drawings that are used to illustrate embodiments of the invention. In the drawings:

FIG. 5A illustrates a method for setting up notification/monitoring areas for an airspace according to one embodiment;

FIG. 8 illustrates a computing/networking device according to one embodiment.

DESCRIPTION OF EMBODIMENTS

Figure 1:
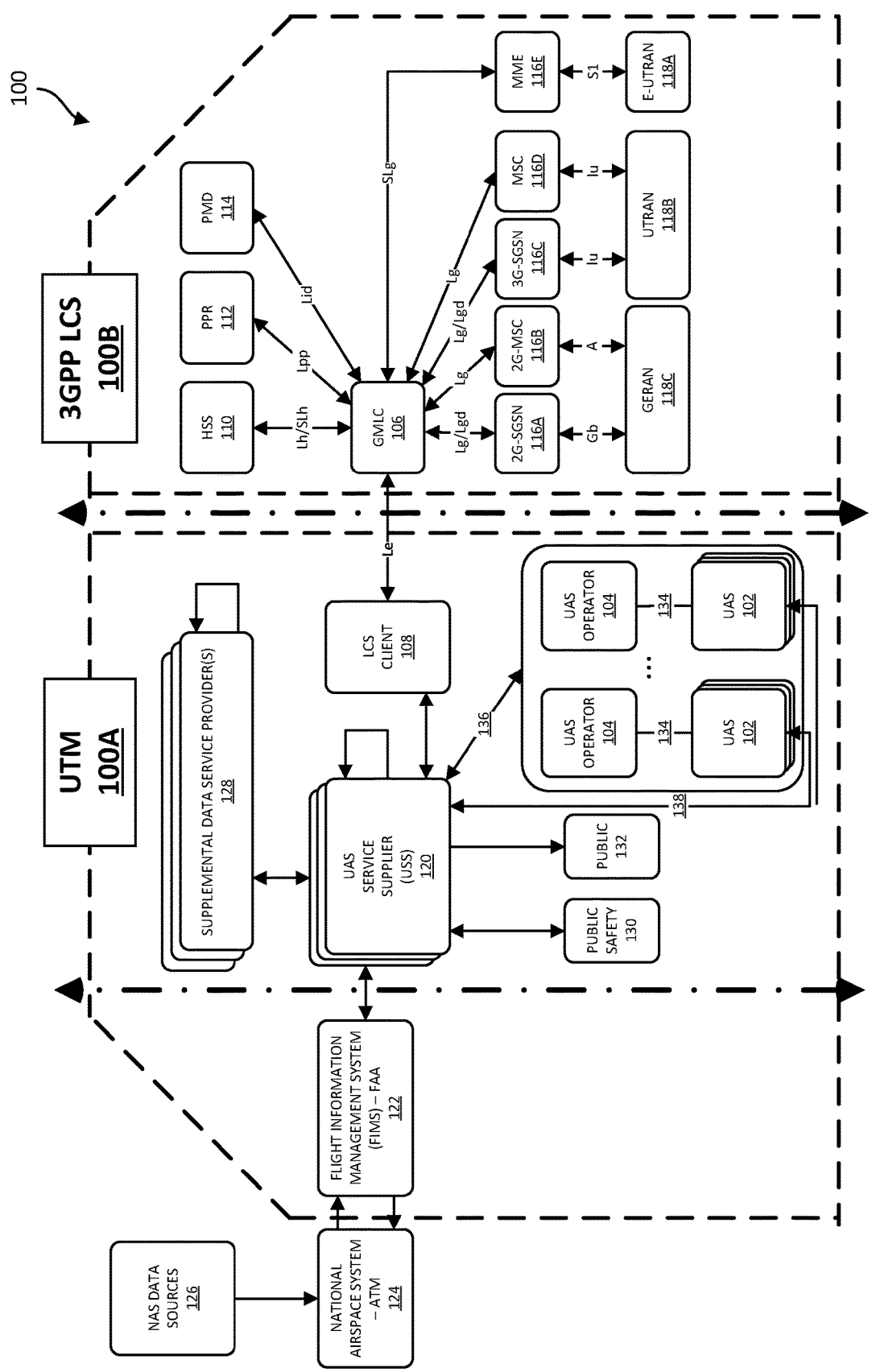
FIG. 1 illustrates an air traffic system, including an Unmanned Aircraft System (UAS) Traffic Management (UTM) system and a 3GPP Location Services (LCS) system, according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system according to one embodiment is presented herein that utilizes 3rd Generation Partnership Project (3GPP) Location Services (LCS) to enforce directives, constraints, flight plans, or any other rules/requirements during Unmanned Aircraft System (UAS) flights. In some embodiments, to enable use of 3GPP LCS, an UAS Traffic Management (UTM) framework utilizes a client that communicates with a Gateway Mobile Location Center (GMLC) server of the LCS over the Le interface. In one embodiment, the client may reside in the UTM architecture as an LCS client. Through the LCS client, a UAS Service Supplier (USS) can set up flight restriction zones and altitudes dynamically based on inputs from various stakeholders and request notifications if a UAS enters a geo-fenced area or departs from an authorized flight plan. For example, the LCS client may send a request to a GMLC corresponding to a network operator of a network to which a UAS is connected. The request may ask the GMLC to monitor an area of interest. The area of interest may be a notification zone (e.g., a no-fly zone) and/or a flight path of the UAS. In the above scenarios, the GMLC may transmit a message/report when the UAS enters the notification zone or moves outside the flight path. Since the 3GPP network and LCS, which are provided by network operators to the UTM, may be governed by governmental or regulatory authorities (e.g., the Federal Communications Commission (FCC)), this provides a standardized and regulated way to track UAS location with minimal involvement from the UTM and UASs. Accordingly, location information may be considered accurate and reliable for purposes of enforcing flight constraints and directives.

Although described in relation to location services provided by a 3GPP protocol, the systems described herein should not be construed as limited to 3GPP protocols or cellular networks. In other embodiments, location services may be provided by other cellular and wireless network providers that offer access to geographical location information of a UAS based on wireless communications of the UAS in networks operated by the network providers. In one embodiment, the location services may be provided by a wireless local area network.

FIG. 1 shows an air traffic system 100 for managing Unmanned Aircraft Systems (UASs) using location services provided by a wireless network, according to one embodiment. The air traffic system 100 may be used for managing the flights of one or more UASs 102 that are controlled/operated/piloted by corresponding UAS operators 104. The UASs 102 may be interchangeably referred to as Unmanned Aerial Vehicles (UAVs) or drones throughout this description. The air traffic system 100 may be divided into two logical portions: an Unmanned Aircraft System (UAS) Traffic Management (UTM) system 100A and a 3GPP Location Services (LCS) system 100B. In this configuration, the 3GPP LCS system 100B provides location services to the UTM system 100A. The 3GPP LCS system 100B provides location information of the UASs 102 based on wireless communications of the UASs 102 in the network operated by the network operator. For instance, the 3GPP LCS system 100B may determine the location information of a particular UAS 102 based on radio signal measurements of the UAS 102 and estimating the location of the UAS 102 based on those radio signal measurements (e.g., based on triangulation of the radio signal measurements). Thus, the 3GPP LCS system 100B provides network determined location information of the UASs 102, as opposed to location information being reported by the UASs 102 themselves.

In some embodiments, the UASs 102 may be small or miniature UASs, which are unmanned aircraft that are small enough to be considered portable by an average man and typically operate/cruise at altitudes lower than larger aircraft. For example, a small UAS may be any unmanned aircraft that is fifty-five pounds or lighter and/or is designed to operate below 400 feet. Although the embodiments described herein may be applied to small UASs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UASs 102 larger than fifty-five pounds and/or UASs 102 that are designed to fly above 400 feet.

The UASs 102 are aircraft without an onboard human controller. Instead, the UASs 102 may be operated/piloted using various degrees of autonomy. For example, a UAS 102 may be operated by a human (e.g., the UAS operator 104) located on the ground or otherwise removed and independent of the location of the UAS 102. For example, a UAS operator 104 may be located on the ground and acts to directly control each movement of a UAS 102 or a group of UASs 102 through a radio control interface (e.g., a command and control (C2) interface). In this embodiment, the UAS operator 104 may transmit commands via the radio interface to cause the UAS 102 to adjust/move particular flight instruments (e.g., flaps, blades, motors, etc.) for the purpose of following a flight plan or another set of objectives. In other scenarios, the UAS operator 104 may provide a flight plan to the UAS 102. In response to the flight plan, the UAS 102 may adjust/move particular flight instruments to fulfill objectives of the flight plan. In these embodiments, a human operator may monitor the progress of the flight plan and intervene as needed or as directed. In some embodiments, the UAS operator 104 may be viewed as the remote human controller, a remote digital controller, an onboard digital controller, or a combination of the preceding.

Figure 2A:
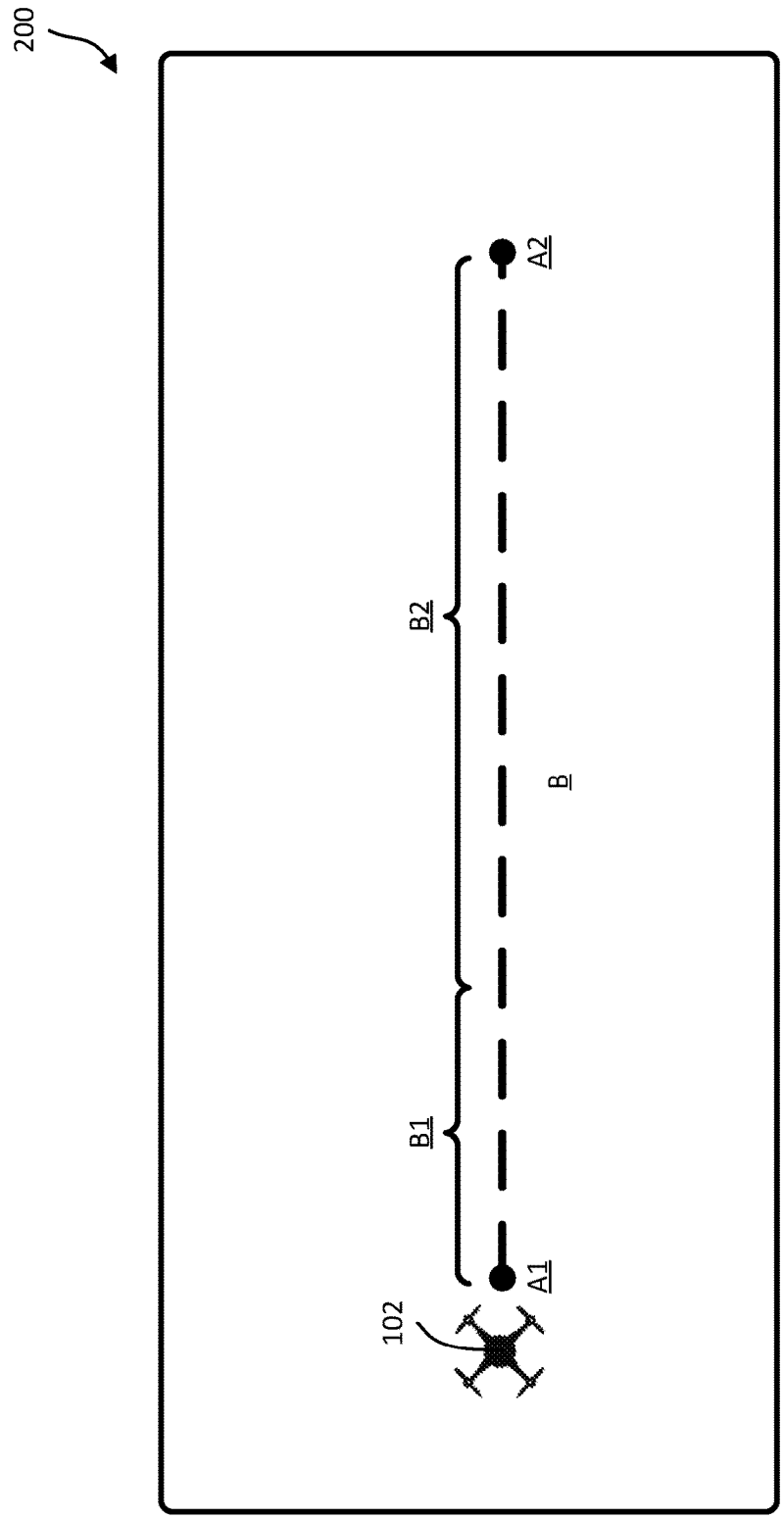
FIG. 2A illustrates an example flight plan with a set of coordinates according to one embodiment.

A flight plan may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2A indicates that the UAS 102 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAS 102 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAS 102 (e.g., altitude limitations above 400 feet and velocity limitations above 100 miles/hour).

Figure 2B:
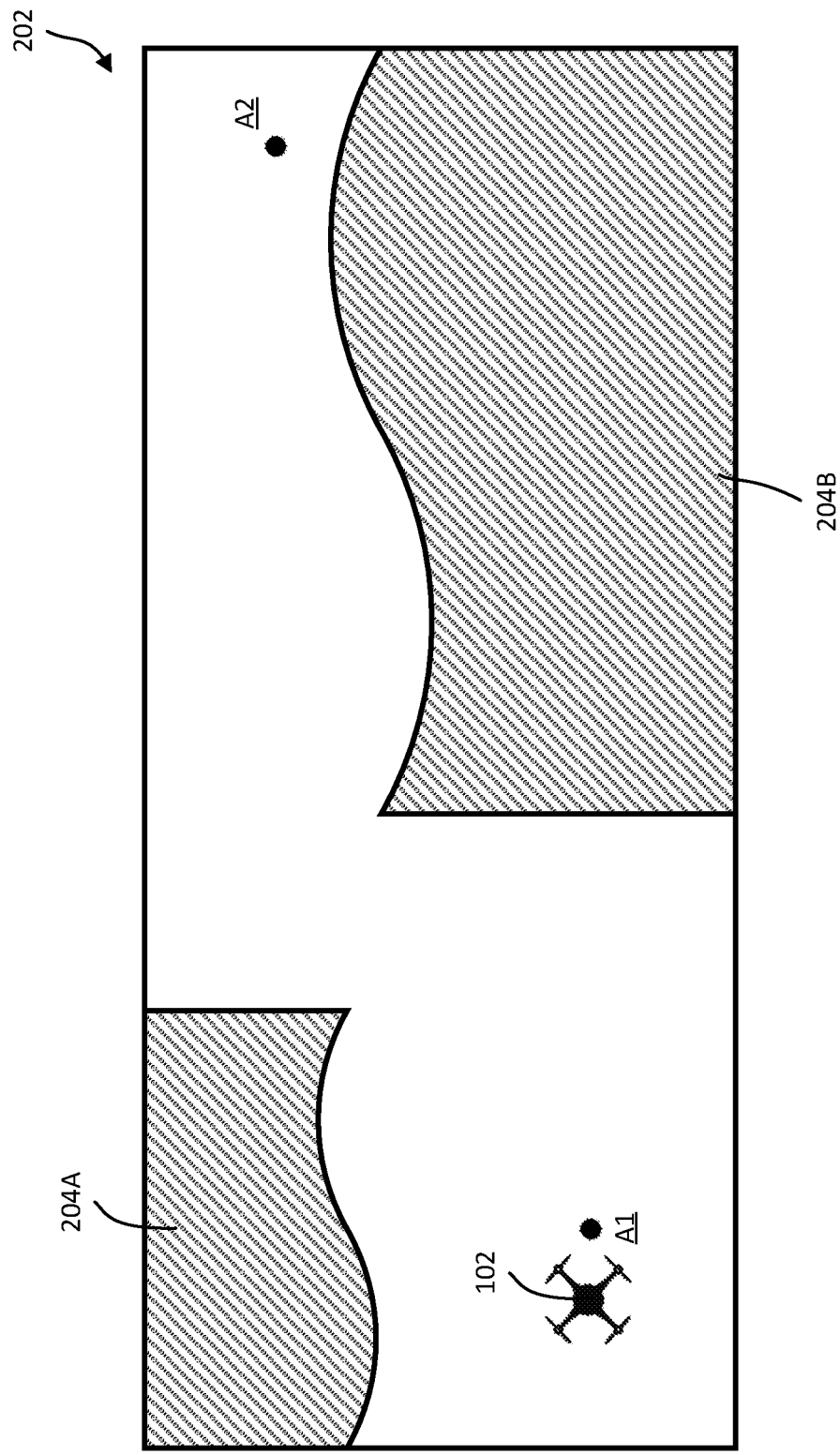
FIG. 2B illustrates an example flight plan with a set of restricted areas/zones according to one embodiment.

In another example, as shown in FIG. 2B, a flight plan 202 may indicate that the UAS 102 is to take off from location A1, travel to location A2, and avoid a set of restricted zones 204A and 204B. In this example, the UAS 102 is directed to reach the target location A2 without entering the set of restricted zones 204A and 204B. The restricted zones may be relative to geographical location (defined by a set of coordinates), an altitude, and/or a velocity. For example, the UAS 102 may be permitted to enter restricted zone 204A but only at a prescribed altitude and/or only at a prescribed velocity.

Figure 2C:
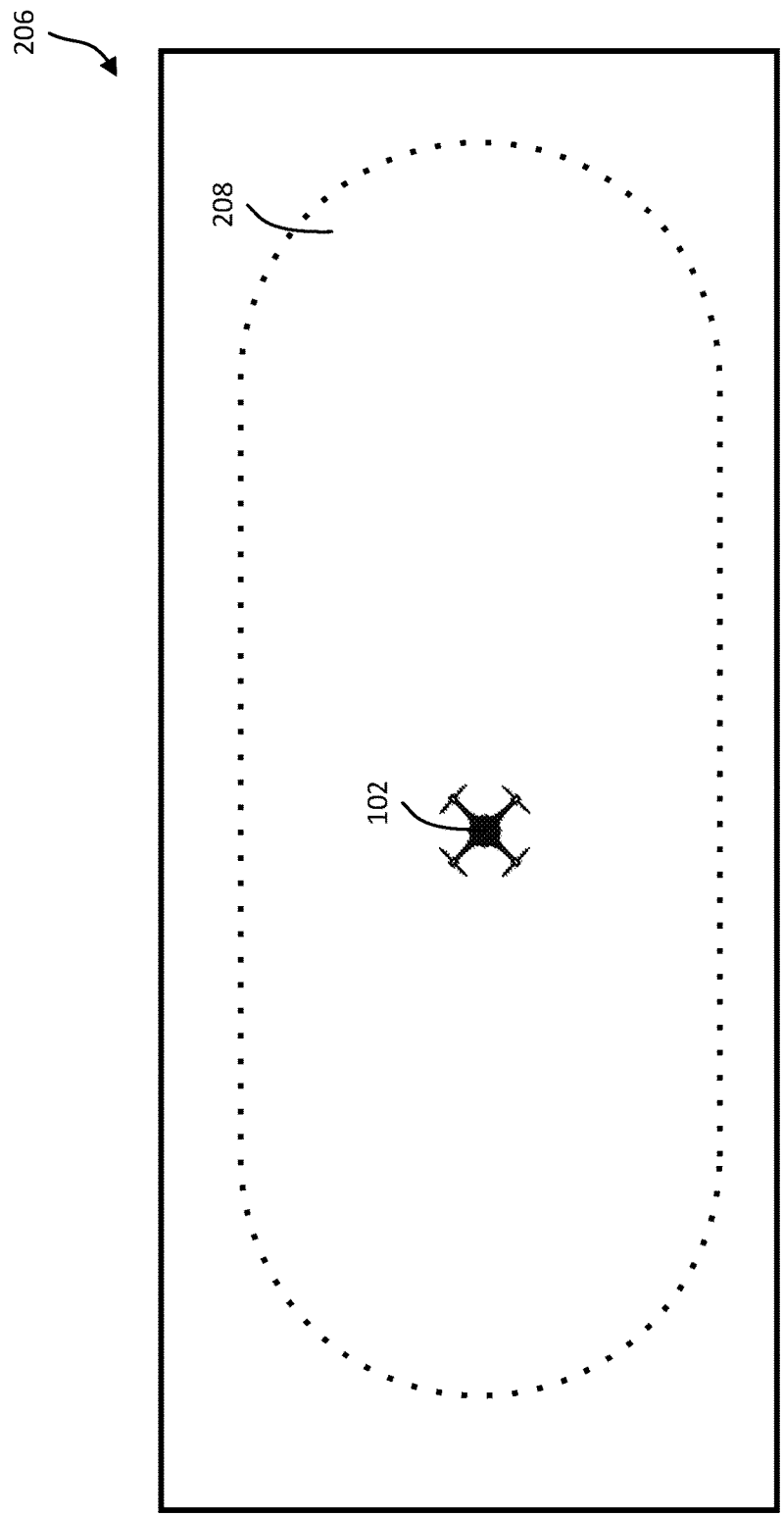
FIG. 2C illustrates an example flight plan with a designated clearance zone according to one embodiment.

In still another example, shown in FIG. 2C, a flight plan 206 may provide clearance for the UAS 102 to fly in a designated clearance zone 208. The clearance zone 208 may be a confined area associated with an altitude range (e.g., between 400-500 feet) and/or an expiration/duration (e.g., an expiration of 11:40 PM). In this example, the UAS 102 may fly anywhere in the designated clearance zone 208 until the clearance has expired.

Although the flight plans described above are provided in relation to diagrams, flight plans may be encoded/presented using any format. For example, a flight plan may be represented and passed to the UAS 102 using an extensible markup language (XML) based format or another encoding or representation that is decodable and parseable by a machine.

Figure 3:
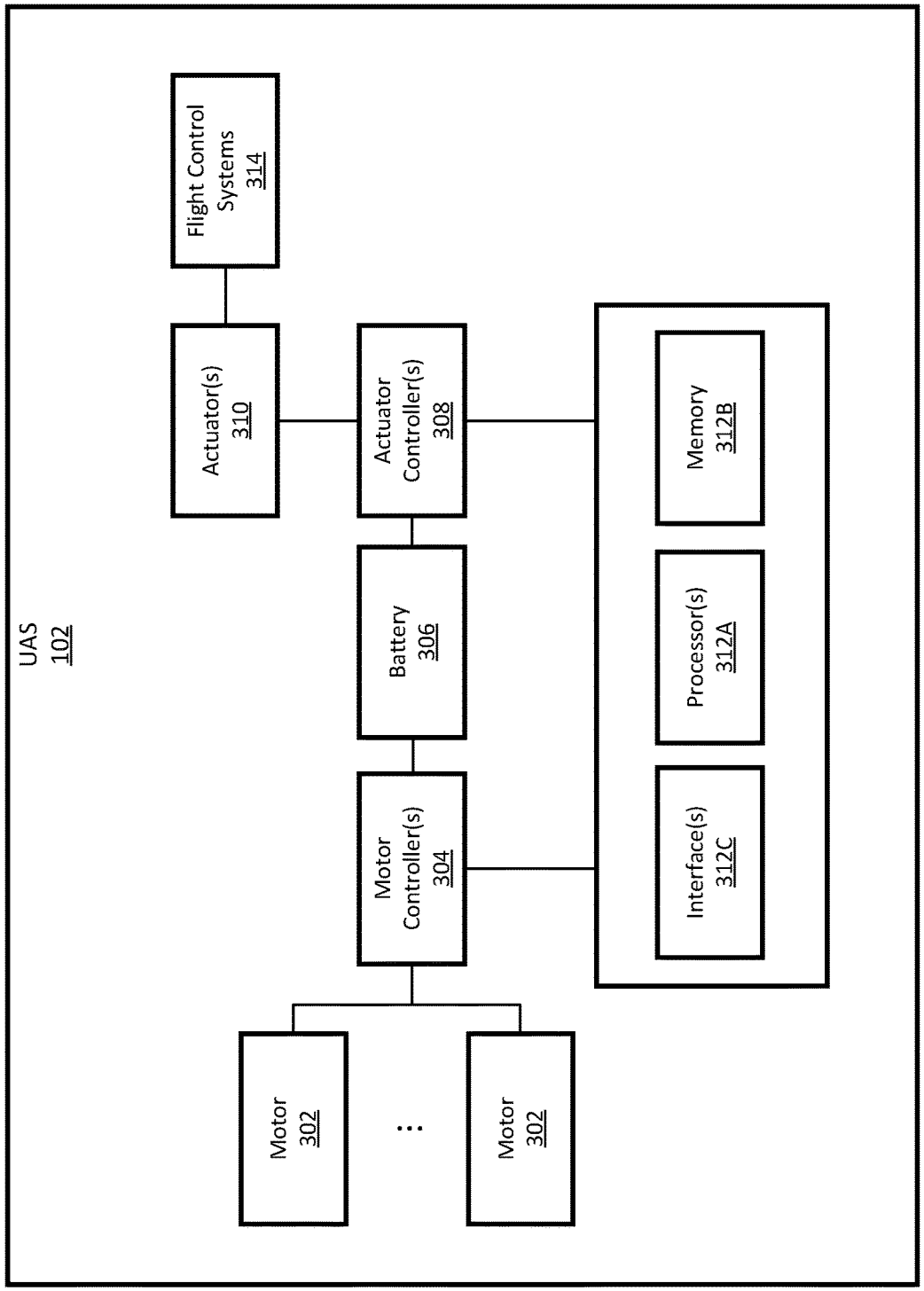
FIG. 3 illustrates a block diagram of a UAS according to one embodiment.

FIG. 3 shows a block diagram of a UAS 102 according to one example embodiment. Each element of the UAS 102 will be described by way of example below and it is understood that each UAS 102 may include more or less components than those shown and described herein.

As shown in FIG. 3, a UAS 102 may include a set of motors 302 controlled by one or more motor controllers 304, which control the speed of rotation of the motors (e.g., rounds per minute). As used herein, the term engine may be used synonymously with the term motor and shall designate a machine that converts one form of energy into mechanical energy. For example, the motors 302 may be electrical motors that convert electricity stored in the battery 306 into mechanical energy. The UAS 102 may include any number of motors 302 that are placed in any configuration relative to the body and/or an expected heading of the UAS 102. For example, the motors 302 may be configured such that the UAS 102 is a multirotor helicopter (e.g., a quadcopter). In other embodiments, the motors 302 may be configured such that the UAS 102 is a fixed wing aircraft (e.g., a single engine or dual engine airplane). In these embodiments, the motors 302, in conjunction with other elements of the UAS 102 serve to keep the UAS 102 in flight and/or propel the UAS 102 in a desired direction. In some embodiments, the UAS 102 may not include motors 302 for propelling the UAS 102 forward. In this embodiment, the UAS 102 may be a glider or lighter than air craft (e.g., a weather balloon).

As noted above, the motors 302 are controlled by one or more motor controllers 304, which govern the speed of rotation of each motor 302. In one embodiment, the motor controllers 304 may work in conjunction with actuator controllers 308 and actuators 310 that control the pitch/angle/rotation of propellers, flaps, slats, slots, rotors, rotor blades/wings, and other flight control systems 314. The motor controllers 304 and actuator controllers 308 may be managed/controlled by one or more processors 312A that are communicatively coupled to a memory 312B and one or more interfaces 312C.

In some embodiments, the memory 312B may store instructions that when executed by the processors 312A cause the UAS 102, via adjustments to settings/parameters of the motor controllers 304 and actuator controllers 308, to move in a particular direction (vertical or horizontal) or maintain a particular flight pattern (e.g., hover at a particular altitude).

The UAS 102 may communicate with one or more other devices using the one or more interfaces 312C. In one embodiment, one of the interfaces 312C in a UAS 102 may comply with a 3GPP protocol. For example, the interface 312C may adhere to one or more of GSM (including General Packet Radio Service (GPRS) and Enhanced Data Rates for GSM Evolution (EDGE)), UMTS (including High Speed Packet Access (HSPA)), and Long Term Evolution (LTE). In some embodiments, one or more interfaces 312C in the UAS 102 may allow a UAS operator 104 and/or other parts of the UTM system 100A to control or provide plans/instructions to the UAS 102.

In one embodiment, the UAS 102 may operate in the E-UTRAN 118A, the UTRAN 118B, and/or the GERAN 118C using one or more of the interfaces 312C. The E-UTRAN 118A, the UTRAN 118B, and/or the GERAN 118C may be administered by a network operator (e.g., a cellular network operator) and the UAS 102 may be a subscriber to one or more of these networks 118A, 118B, and 118C. The E-UTRAN 118A, the UTRAN 118B, and/or the GERAN 118C may comprise various network devices. Each of the network devices may, in some embodiments, be electronic devices that can be communicatively connected to other electronic devices on the network (e.g., other network devices, user equipment devices (such as the UASs 102), radio base stations, etc.). In certain embodiments, the network devices may include radio access features that provide wireless radio network access to other electronic devices (for example a "radio access network device" may refer to such a network device) such as user equipment devices (UEs). For example, the network devices may be base stations, such as an eNodeB in Long Term Evolution (LTE), a NodeB in Wideband Code Division Multiple Access (WCDMA), or other types of base stations, as well as a Radio Network Controller (RNC), a Base Station Controller (BSC), or other types of control nodes. In some embodiments, an interface 312C in a UAS 102 may assist in estimating a geographical location of the UAS 102 based on communications within the E-UTRAN 118A, the UTRAN 118B, and/or the GERAN 118C as described in further detail below.

Although described in relation to the geographical location of the UAS 102, the location information provided by the 3GPP LCS system 100B may be extended to also include additional pieces of information. For example, in addition to geographical location and velocity, the location information provided by the 3GPP LCS system 100B may also include direction/heading of the UAS 102 as estimated by the access networks E-U IRAN 118A, UTRAN 118B, and GERAN 118C. In some embodiments, the location information may describe an estimated current location, velocity, and/or heading of the UAS 102 or an anticipated location, velocity, and/or heading of the UAS 102.

A UAS operator 104 may maintain a connection with a corresponding UAS 102 via connection 134. The connection 134 may be established through one or more interfaces 312C and may form a wireless command and control (C2) connection that allows the UAS operator 104 to control the UAS 102 through direct commands and/or through issuance of a flight plan. In some embodiments, the connection 134 may additionally allow the UAS operator 104 to receive data from the UAS 102. For example, the data may include images, video streams, telemetry data, and system status (e.g., battery level/status). In some embodiments, the connection 134 may be a point-to-point (e.g., mesh) connection while in other embodiments the connection 134 between the UAS operator 104 and the UAS 102 may be part of a distributed network. In one embodiment, the connection 134 is separate from the access networks E-UTRAN 118A, UTRAN 118B, and GERAN 118C while in other embodiments the connection 134 is part of one of the access networks E-UTRAN 118A, UTRAN 118B, and GERAN 118C.

In one embodiment, the UAS operator 104 may maintain a connection with other elements of the UTM system 100A. For example, the UAS operator 104 may maintain connection 136 with a UAS Service Supplier (USS) 120. In some embodiments, the connection 136 may be a point-to-point connection while in other embodiments the connection 136 may be part of a distributed network. In one embodiment, the connection 136 is separate from the access networks E-UTRAN 118A, UTRAN 118B, and GERAN 118C while in other embodiments the connection 136 is part of one of the access networks E-UTRAN 118A, UTRAN 118B, and GERAN 118C.

In one embodiment, the UAS 102 may maintain a connection with the USS 120. For example, the UAS operator 104 may maintain the connection 138 with USS 120. In some embodiments, the connection 138 may be a point-to-point connection while in other embodiments the connection 138 may be part of a distributed network. In one embodiment, the connection 138 is separate from the access networks E-UTRAN 118A, UTRAN 118B, and GERAN 118C while in other embodiments the connection 138 is part of one of the access networks E-UTRAN 118A, UTRAN 118B, and GERAN 118C. In one embodiment, the connection 138 may allow the transmission of one or more pieces of data to the USS 120, including telemetry, authentication/authorization (e.g., using a subscriber identity/identification module (SIM) based identity to check UAS 102 registrations and authorizations), reports and logs (e.g., to establish liability in case of accidents), and commands to ensure compliance and safety (e.g., land immediately). The connection 138 may alternatively provide access to a data center to provide data for storage for the UAS 102 (e.g., storage of video streams or images captured by the UAS 102).

As noted above, the connection 136 between the UAS operator 104 and the USS 120 may be part of one of the access networks E-UTRAN 118A, UTRAN 118B, and GERAN 118C such that the UAS operator 104 is a subscriber of one of the access networks 118A, 118B, and 118C. In this embodiment, the USS 102 may retrieve location information, describing the location of the UAS operator 104 via the 3GPP LCS system 100B based on communications/interactions between the UAS operator (e.g., a device of the UAS operator 104) and the access network 118A, 118B, and 118C. For instance, the USS 120 may request the 3GPP LCS system 100B to monitor an area of interest in relation to the UAS operator 104 or to provide location information of the UAS operator 104 upon request or at an interval. Location information of the UAS operator 104 may be used in various scenarios. In one embodiment, the location information of the UAS operator 104 may be used to enforce constraints or directives related to the location of the UAS operator 104 relative to the location of the UAS 102. For example, an authorized flight plan of the UAS 102 may restrict operation of the UAS 102 only while the UAS operator 104 is within a predefined distance from the UAS 102 (e.g., the UAS operator 104 and the UAS 102 are within 300 feet from each other). In this example, the USS 120 may obtain location information of both the UAS 102 and the UAS operator 104 from the 3GPP LCS system 100B and transmit notifications or take other corrective action when this predefined distance is exceeded. In another example, an authorized flight plan of the UAS 102 may restrict operation of the UAS 102 only while the UAS operator 104 maintains visual line of sight (VLOS) with the UAS 102. In this example, the USS 120 may determine whether the UAS 102 is visible to the UAS operator based on the location of the UAS 102 and the UAS operator (as provided by the 3GPP LCS system 100B) and geographical characteristics of the area between the UAS operator 104 and the UAS 102 (e.g., the presence of mountains or other obstructions). Upon the USS 120 determining that the UAS operator 104 has failed to maintain VLOS with the UAS 102 based at least on location information of the UAS 102 and UAS operator 104 received from the 3GPP LCS system 100B, the USS 120 may transmit notifications or take other corrective action.

Although described above as the USS 120 determining a failure to meet a distance requirement between the UAS 102 and the UAS operator 104, in another embodiment the 3GPP system 100B may determine that the UAS 102 and the UAS operator 104 are not within a defined distance and/or fail to maintain VLOS. For example, the USS 120 may transmit identifiers of the UAS 102 and the UAS operator 104 along with a distance or VLOS requirement to a component of the UTM 100B (e.g., the GMLC 106). In this embodiment, the distance may be relative to an area around the UAS 102 or the UAS operator 104 and may be considered an area of interest. For example, upon the UAS operator 104 falling outside the area of interest defined by an area centered on the UAS 102 and having a diameter of the provided distance, the UTM 100B may inform the USS 120 of this event.

In one embodiment, the connection 136 allows the UAS operator 104 to transmit data to or receive data from the USS 120 regarding a current, past, or future flight. For instance, the connection 136 may allow the UAS operator 104 to convey to the USS 120 one or more of the following: airspace information, alarms and notifications, authentication/authorization (e.g., use of a SIM based identity to check UAS 102 and pilot/UAS operator 104 registrations and authorizations), and reports and logs (e.g., to establish a liability in case of accidents).

In some embodiments, the UAS operator 104 may transmit a proposed flight plan to the USS 120 via the connection 136. In one embodiment, the UTM system 100A may include a plurality of USSs 120. The set of USSs 120 may alternatively be referred to as a USS network. Each USS 120 offers support for safe airspace operations based on information received from a set of stakeholders and other information sources. The USSs 120 may share information about their supported operations to promote safety and to ensure that each USS 120 has a consistent view of all UAS 102 operations and thus enable the UASs 102 to stay clear of each other.

As noted above, the USSs 120 may receive information from a variety of stakeholders and information sources such that the USSs 120 may determine whether a proposed flight plan is authorized to proceed. For example, the Federal Aviation Association (FAA) may provide directives and constraints to the USSs 120 via the Flight Information Management System (FIMS) 122. The FIMS 122 provides administration officials a way to issue constraints and directives to the UAS operators 104 and/or the UASs 102 via a USS 120. Such constraints and directives may be based on information received from the National Airspace System (NAS) Air Traffic Management (ATM) system 124 and/or other NAS data sources 126. In this example, the ATM system 124 could be used to mark certain restricted areas (e.g., airports and military bases) for the UASs 102 or restrict flights over forest fire areas or other spaces which are normally permitted for the UASs 102. In addition to the airspace state and other data provided by the ATM system 124 and other NAS data sources 126, the FIMS 122 may provide impact data, which may describe effects caused by the UASs 102 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 122, the USSs 120 may receive data from supplemental data service providers 128. These supplemental data service providers 128 may provide various pieces of data that are used by the USSs 120 in planning and authorizing a flight plan, including terrain, weather, surveillance, and performance information. The supplemental data service providers 128 may communicate amongst each other to insure consistency and accuracy of information. In some embodiments, the supplemental data service providers 128 may provide data that is presented/transmitted to UAS operators 104 via the USS 120 for the planning of a flight plan/mission.

In some embodiments, the USSs 120 may receive constraints from public safety sources 130. This information may limit UAS 102 missions over areas when such flights may negatively affect public safety. For example, UAS 102 missions may be limited over areas that are currently hosting events with large crowds of people. In some embodiments, the public safety sources 130 may provide data that is presented/transmitted to UAS operators 104 via the USS 120 for the planning of a flight plan/mission. The USSs 120 may also make UAS 102 flight/operations information available to the public 132.

As noted above, the USS 120 may determine if a proposed flight plan is authorized in view of directives, constraints, and information received from various stakeholders/sources. After concluding that the proposed flight plan is authorized or not authorized to proceed, the USS 120 may transmit a response to the UAS operator 104. In response to receiving an authorized flight plan, the UAS operator 104 may begin controlling the UAS 102 to effectuate the authorized flight plan or the UAS operator 104 may transmit the authorized flight plan or some set of instructions describing the objectives of the authorized flight plan to the UAS 102. Based on inputs from the UAS operator 104, the processor 312A together with instructions stored in the memory 312B may control the motor controllers 304 and/or actuators 310 to achieve the objectives of the flight plan.

To ensure that the UAS 102 does not deviate from the authorized flight plan, the USS 120 may make use of geographical location information (e.g., the current location of the UAS 102). In one embodiment, this location information may be received/accessed by the UTM system 100A, via a LCS client 108, from the 3GPP LCS system 100B. The 3GPP LCS system 100B may represent a service standardized by various organizations. For example, the 3GPP LCS system 100B may be covered under Global System for Mobile Communications (GSM) and Universal Mobile Telecommunications Service (UMTS). As described herein, the 3GPP LCS system 100B specifies network elements/entities, the functionalities of all elements/entities, interfaces for inter/intra element/entity communications, as well as messages used to implement positioning functionality in a network. The 3GPP LCS system 100B may include access to location information, such as longitude and latitude coordinates, altitude, velocity, and direction/heading of a UAS 102. In one embodiment, the location information may be provided at a prescribed interval (e.g., every minute), upon request, or in response to an event (e.g., a UAS 102 entering a specified area).

As shown, the 3GPP LCS system 100B may include a Gateway Mobile Location Centre (GMLC) 106, which contains functionality required to support location services. The GMLC 106 may act as the gateway to the 3GPP LCS system 100B for the UTM system 100A. As such, the GMLC 106 is generally the first node an external LCS client 108 of the UTM system 100A accesses when attempting to obtain location information from the 3GPP LCS system 100B. As shown, the LCS client 108 within the UTM system 100A may access/communicate with the GMLC 106 via the Le interface. In some embodiments, the Le interface may require extensions to provide additional information (e.g., altitude information to provide three-dimensional geo-fencing zones). The GMLC 106 may be network/network operator specific and each network may include one or more GMLCs 106.

In one embodiment, the GMLC 106 may be communicatively coupled to various support services, including a Home Subscriber Server (HSS) 110, a Privacy Profile Register (PPR) 112, and a Pseudonym Mediation Device (PMD) 114. For example, the GMLC 106 may request information from the HSS via the Lh or SLh interfaces. The HSS 110 may contain or have access to a master user database that supports network access. For example, the HSS 110 may contain or have access to subscription-related information (subscriber profiles) for performing authentication and authorization of users (e.g., authentication of an account associated with an interface 312C of the UAS 102). In some embodiments, the HSS 110 can provide information about the subscriber's location and Internet Protocol (IP) information. In some embodiments, the HSS 110 may function similarly to a GSM home location register (HLR) and/or an Authentication Centre (AuC).

In some embodiments, the UTM system 100A may request and receive network subscription information associated with a UAS 102. In particular, since the 3GPP LCS system 100B is network operator specific, the UTM system 100A must be aware of which network operator and what account is associated with a UAS 102. Upon receipt of network subscription information associated with a UAS 102, the LCS client 108 may pass along this information to an applicable GMLC 106 (e.g., a GMLC 106 associated with the network operator designated in the received subscription information). A GMLC 106 that received this information may work in conjunction with the HSS 110 and/or another support service in the 3GPP LCS system 100B to access location information associated with the applicable UAS 102.

In some embodiments, the GMLC 106 may utilize the PPR 112 to perform a privacy check via the Lpp interface. In some embodiments, the HSS 110 may provide the GMLC 106 with an address to access the PPR 112. Although shown as separate, in some embodiments, the PPR 112 may be integrated within the GMLC 106.

In some embodiments, the GMLC 106 may utilize the PMD 114 to translate a pseudonym of a target UAS 102 with a verinym/true identity (e.g., International Mobile Subscriber Identity or Mobile Station Integrated Services Data Network) via the Lid interface. The PMD 114 may be separate from the GMLC 106 and the PPR 112 or integrated within either.

The GMLC 106 may send positioning/location requests to various controllers 116 associated with separate wireless networks 118. In response to the requests, the controllers 116 coordinate and submit final location estimates of a corresponding UAS 102 to the GMLC 106. In some embodiments, the GMLC 106 may communicate via the Lg (Mobile Application Part-based) or Lgd (Diameter-based) interfaces with a 2G Serving General Packet Radio Service (GPRS) Support Node (SGSN) 116A or via the Lg interface with a 2G Mobile services Switching Centre (MSC) 116B for a GSM EDGE Radio Access Network (GERAN) 118C. In this embodiment, the 2G-SGSN 116A may communicate with the GERAN 118C via the Gb interface and the 2G-MSC 116B may communicate with the GERAN 118C via the A interface. The 2G-SGSN 116A and the 2G-MSC 116B may manage charging/billing, location request management, authorization of location services, and general operation of location services for the GERAN 118C.

In some embodiments, the GMLC 106 may communicate via the Lg or Lgd interfaces with a 3G-SGSN 116C or via the Lg interface with an MSC server 116D for a Universal Terrestrial Radio Access Network (UTRAN) 118B. In this embodiment, the 3G-SGSN 116C and the MSC server 116D may communicate with the UTRAN 118B via the Iu interface. The 3G-SGSN 116C and the MSC server 116D may manage charging/billing, location request management, authorization of location services, and general operation of location services for the UTRAN 118B.

In some embodiments, the GMLC 106 may communicate via the SLg interface with a Mobility Management Entity (MME) 116E of an Evolved Universal Mobile Telecommunications System (UMTS) Terrestrial Radio Access Network (E-UTRAN) 118A. In this embodiment, the MME 116E may communicate with the E-UTRAN 118A via the S1 interface. The MME 116E may manage charging/billing, location request management, authorization of the LCS services, and general operation of location services for the E-UTRAN 118A.

As noted above, the access networks E-UTRAN 118A, UTRAN 118B, and GERAN 118C may estimate the location of a UAS 102 and make this location information available to other systems (e.g., the UTM system 100A). In particular, the access networks E-UTRAN 118A, UTRAN 118B, and GERAN 118C, that facilitate determination of the locations of user equipment (e.g., the UASs 102), are able to exchange location information with the core network (e.g., the controllers 116 and/or the GMLC 106) when connected to the core network. Location information may also be communicated between GMLCs 106, located in the same or a different public land mobile network (PLMN), via the specified GMLC to GMLC interface.

By making use of the radio signals, the capability to determine the (geographic) location of the user equipment (UE) or mobile station (UE) (e.g., the UASs 102) is provided. The location information may be requested by and reported to a client (application) associated with the UE, or by a client within or attached to the core network. The location information request may ask for the velocity of the UE as part of the location information. The location information may be reported using geographical co-ordinates together with the time-of-day and the estimated errors (uncertainty) of the location of the UE.

As noted above, the UTM system 100A may include a LCS client 108. The LCS client 108 may bridge the UTM system 100A and the 3GPP LCS system 100B to allow air traffic system 100 to manage flights of the UASs 102 based on the location information provided by the 3GPP LCS system 100B. In particular, the UTM system 100A may ensure that the UASs 102 adhere to directives, constraints, approved flight plans, approved deviations, and other rules and regulations based on locations provided in real time via the LCS client 108 and the GMLC 106. In this fashion, the USSs 120 and/or the FIMS 122 may offload some of the complexity in tracking locations of all the UASs 102. Further, the location information of UASs 102 can be trusted and regarded as accurate as it is reported by a trusted and reliable entity (e.g., the network operator).

In some embodiments, one or more of the portions of the air traffic system 100 may be implemented through virtualization. For example, a cloud execution environment (e.g., one or more virtual machines or containers) may be used by the GMLC 106 to manage requests from the LCS client 108.

Figure 4:
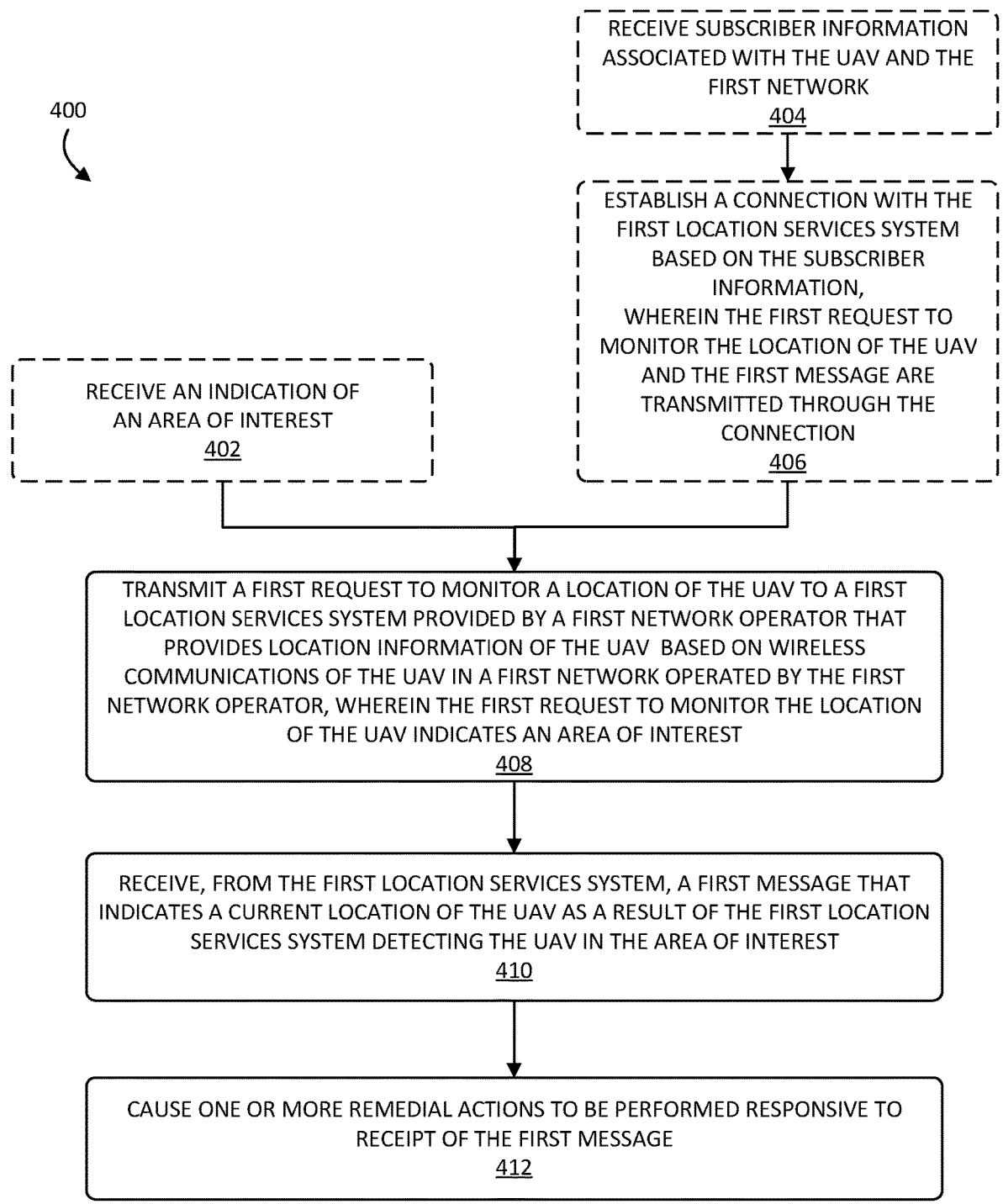
FIG. 4 illustrates a method for managing the flight of a UAS according to one embodiment.

Turning now to FIG. 4, a method 400 will be described for managing the flight of a UAS 102 according to one embodiment. The method 400 may commence at operation 402 with the receipt of an indication or representation of an area of interest for a UAS 102. The area of interest for the UAS 102 may be represented in part through a proposed flight plan and/or through a notification/monitoring area (e.g., a no-fly zone and/or a permitted-fly only zone), which may be indicated by coordinates or a map, for example.

A notification/monitoring area defines an area in which a notification may be sent when the UAS 102 enters an area in which the UAS 102 is not permitted (such as a no-fly zone), or in other circumstances when the UAS 102 exits an area in which the UAS 102 is only permitted (such as a permitted-fly only zone). An exemplary method of establishing a notification/monitoring area will be described with respect to the exemplary embodiment of FIGS. 5A and 5B.

A proposed flight plan may include one or more of a path (e.g., a starting point, an ending point, and/or a set of waypoints defined by longitudinal and latitudinal coordinates), a set of velocities, a set of altitudes, a heading/direction, a set of events (e.g., capture video at prescribed times or locations, hover over an area for a specified interval, etc.), a time/duration, a set of permitted zones/areas (e.g., fly-only zones), and a set of restricted zones/areas (e.g., no-fly zones) that describe a proposed mission/flight for the UAS 102. The proposed flight plan may be transmitted from the UAS operator 104 to the USS 120 via any technique, including submission through a web portal in one embodiment. An exemplary method of establishing a flight plan and monitoring the UAS 102 according to the flight plan will be described with respect to the exemplary embodiment of FIGS. 6A and 6B.

In some embodiments, subscriber information associated with the UAS 102 and a network, in which the UAS 102 is a subscriber, may be received at operation 404. The network may be operated by a network operator and may be a wireless local area network or a cellular network (e.g., a 3rd Generation Partnership Project (3GPP) network that includes one or more of the access networks E-UTRAN 118A, UTRAN 118B, and GERAN 118C, which provide location information to a GMLC 106) or any other network that provides communication service to the UAS 102 along with location services for the UAS 102. At operation 406 a connection with the 3GPP LCS system 100B may be established based on the subscriber information. The connection may be later utilized to pass information/requests between the USS 120 and/or the LCS client 108 and the GMLC 106.

At operation 408, a request may be transmitted to monitor a location of the UAS 102. The request may be sent to a location services system (e.g., 3GPP LCS system 100B) that provides location information of the UAS 102 based on wireless communications of the UAS 102 in the network operated by the network operator. In some embodiments, the request to monitor the location of the UAS 102 indicates an area of interest and may be transmitted through the connection established at operation 406. In an embodiment where the area of interest is represented in part through a proposed flight plan, the request to monitor the location of the UAS 102 may be transmitted in response to successfully verifying that the proposed flight plan complies with the set of directives and constraints.

At operation 410, a message may be received from a location services system that indicates a current location of the UAS 102 as a result of the location services system detecting the UAS 102 in the area of interest. The area of interest may be one of an area in which the UAS 102 is not permitted or an area outside a flight path in which the UAS 102 is authorized to fly. In some embodiments, the area of interest may be a flight path in which the UAS 102 is authorized to fly. In these embodiments, a message may be transmitted at operation 410 in response to the location services system detecting the UAS 102 outside or exiting the area of interest. In some embodiments, the message includes an identifier of the UAS 102 and information describing the area of interest and may originate from the GMLC 106.

As noted above, the location services system determines the location of the UAS 102 based on communications of the UAS 102 in a wireless network associated with the location services system. For example, the 3GPP LCS system 100B may provide location services for the UAS and the UAS 102 may communicate in one or more of the access networks E-UTRAN 118A, UTRAN 118B, and GERAN 118C. Based on these communications (e.g., data and/or control transmission), the GMLC 106 together with other core network components may determine the current location of the UAS 102 and provide this current location to the UTM system 100A via the message at operation 410. Accordingly, the location of the UAS 102 is determined based on communications of the UAS 102 in a wireless network, but the UAS 102 does not estimate/determine the location.

As described above, the UTM system 100A may track the location of the UAS 102 based on information provided by the 3GPP LCS system 100B. In this way, the UAS 102 is not required to provide location information to the UTM system 100A and the UTM system 100A may offload the complexity and effort in determining the location of the UAS 102 to the 3GPP LCS system 100B. Since the 3GPP LCS system 100B determines the location of the UAS 102 during the course of cellular communications involving the UAS 102, the 3GPP LCS system 100B is equipped to efficiently provide location information to the UTM system 100A for areas of interest to the UTM system 100A.

In response to receipt of the message, operation 412 may cause one or more remedial actions to be performed. In one embodiment, the USS 120 may transmit a warning to the UAS operator 104 corresponding to the UAS 102 that is determined to be violating a directive, constraint, flight plan, or any other rule/requirement. The warning may be issued to an electronic device associated with the UAS operator 104 of the UAS 102 (e.g., an email or a text message on a computing device associated with the UAS operator 104 and/or the UAS 102). The warning may identify the offending UAS 102, the violation, and possible or required remedial steps. In addition, or in another embodiment, the USS 120 may transmit a command to the UAS 102 to cause the UAS 102 to take a remedial step. For example, the USS 120 may send a command to cause the UAS 102 to immediately land at a prescribed landing zone, change altitude, or navigate to a permitted area. The above described commands may cause the UAS 102 to take action to correct the violation without interaction with or from a UAS operator 104.

Figure 5B:
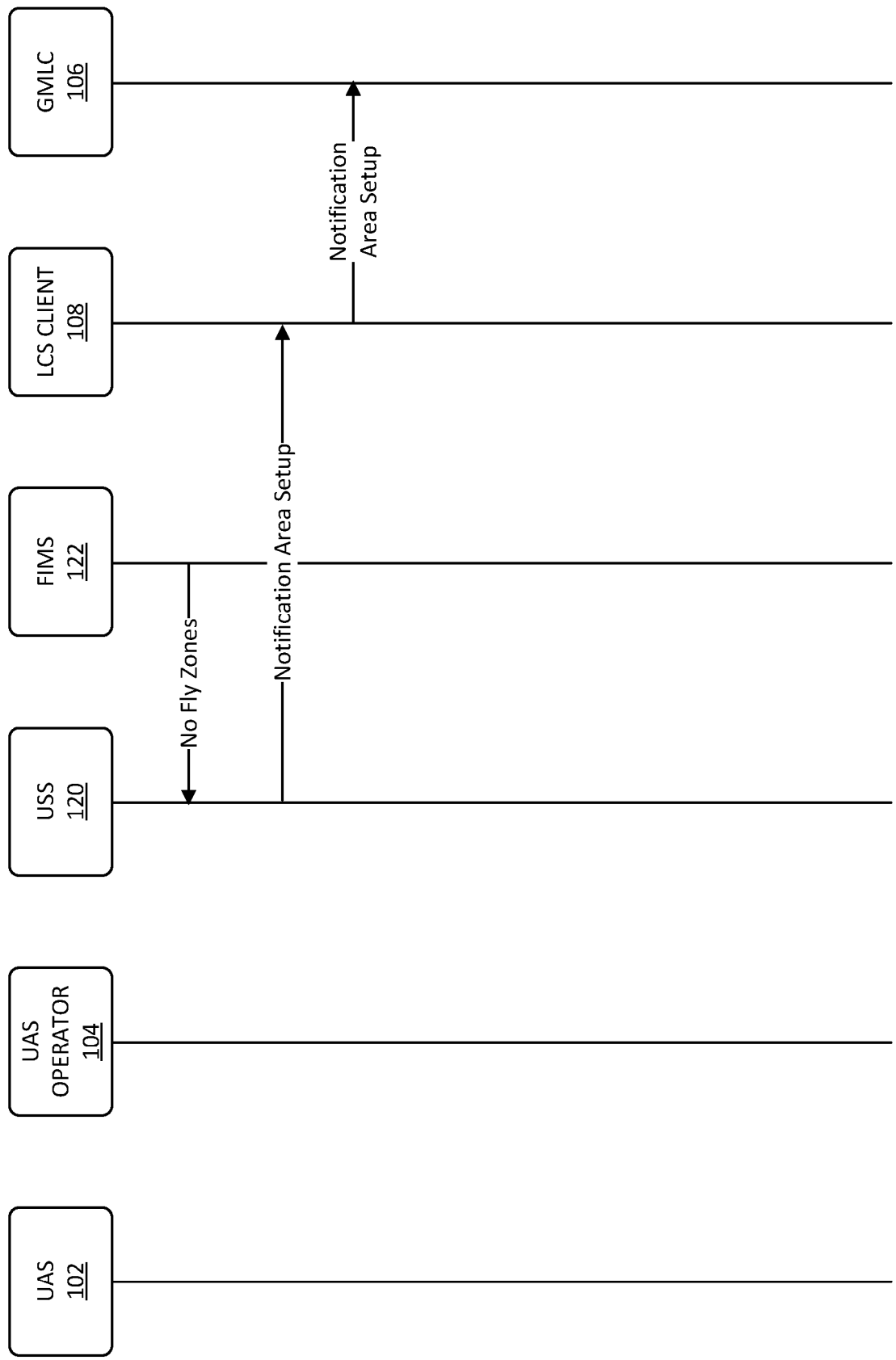
FIG. 5B illustrates an example exchange for setting up notification/monitoring areas according to one embodiment.

Turning now to FIG. 5A, a method 500 will be described for setting up notification/monitoring areas for an airspace, according to an embodiment. The method 500 may be viewed together with the example exchange shown in FIG. 5B. The method 500 commences when the FIMS 122 generates a set of constraints/directives at operation 502. In one embodiment, as shown in FIG. 5B, these directives/constraints may include a set of no-fly zones in which the UASs 102 may not fly. For example, the no-fly zones may correspond to defined areas in which the UASs are never permitted to fly (e.g., an area over or adjacent to a military base) or areas in which the UASs are temporarily not permitted to fly (e.g., an area over or adjacent to a forest fire). Although described and shown in FIGS. 5A and 5B in relation to directives/constraints received from the FIMS 122, in other embodiments the method 500 may similarly function with information that sets up notification/monitoring areas from other sources (e.g., the supplemental data service providers 128).

The directives/constraints may be communicated to a USS 120 at operation 504 as a set of longitude and latitude coordinates defining an area/perimeter, a restricted altitude, and/or a time period/duration for which the directives/constraints are valid. In some embodiments, the directives/constraints may be associated with a particular set of the UASs 102 (e.g., a subset of all UASs 102 may not fly in a particular area). In these embodiments, the directives/constraints may be associated with or include UAS identifiers. In some embodiments, the directives/constraints may be transmitted to all USSs 120 in the UTM system 100A or the directives/constraints may be transmitted to one or more USSs 120 and the USSs 120 may thereafter share this information with the other USSs 120.

Upon receipt, a USS 120 may generate and transmit to an LCS client 108 a request to set up a notification area for monitoring (a request to monitor an area of interest) at operation 506. In embodiments in which the UTM system 100A includes multiple LCS clients 108 (e.g., separate LCS clients 108 associated with separate network operators and/or UASs 102), the USS 120 may transmit to all LCS clients 108 or a single LCS client 108. In some embodiments, the LCS client 108 may translate the request into a format that is acceptable/readable by a GMLC 106. In one embodiment, the request may include a set of UAS 102 identifiers and an area of interest to be monitored by the 3GPP LCS system 100B.

Following receipt of a request to set up a notification area, the LCS client 108 may transmit a request to set up a notification area to one or more GMLCs 106 at operation 508. The GMLCs 106 may set up and monitor the notification area based on this request at operation 510. In one embodiment, the LCS client 108 may transmit the same request received from the USS 120 to the one or more GMLCs 106. In other embodiments, the LCS client 108 may translate the request received from the USS 120 into information that would be understood by the particular GMLCs 106 receiving the information. In some embodiments, the LCS client 108 may log the request to set up a notification area for future reference. In particular, upon later receiving location information from a GMLC 106, the LCS client 108 may reference the log to determine an appropriate USS 120 to forward the location information. In one embodiment, the request transmitted to the GMLCs 106 may include a set of UAS 102 identifiers and an area of interest to be monitored by the 3GPP LCS system 100B.

In one embodiment, the constraint/directives and/or request to set up a notification area may include information regarding report timing. For example, the request to set up a notification area may request that information be provided at a prescribed interval, only upon request, or on the occurrence of an event (deferred location request). For example, upon a UAS 102 (e.g., a UAS 102 identified in the request to set up a notification area) entering a notification area, the GMLC 106 may send a notification to the USS 120 via the LCS client 108. In this fashion, this deferred location request allows the GMLC 106 to provide geo-fencing and enforcement through the use of Deferred Location Requests.

As described above, the GMLCs 106 may be associated with a specific network operator covering a specified area and each of the UASs 102 may be subscribed to a wireless service provided by a network operator. Accordingly, the LCS client 108 may transmit information only to those GMLCs 106 that operate in an area affected by the directive/constraints or are associated with UASs 102 addressed by the request to set up a notification area. In some embodiments, prior to utilizing location services, the UTM system 100A may receive subscription information associated with a UAS 102. For example, when a UAS 102 and/or a UAS operator 104 is registering a flight plan with the UTM system 100A, the UAS 102 and/or the UAS operator 104 may provide subscription information along with the flight plan such that the LCS client 108 may establish a connection with the appropriate GMLC 106. In some embodiments, establishing a connection to the correct GMLC 106 is part of a bootstrapping or authentication procedure between the UAS 102 and the UTM system 100A. Based on this established connection, the LCS client 108 may transfer notification requests to the appropriate GMLCs 106 located in the 3GPP LCS system 100B and thereafter transfer location information from the GMLCs 106 to the USSs 120.

In some embodiments, each GMLC 106 may monitor several notification areas. As described in further detail below, upon detecting that a UAS 102 enters or exits one of the notification areas being monitored by the GMLC 106 based on location information received from one of the controllers 116, the GMLC 106 notifies the LCS client 108 of the occurrence of this event. The LCS client 108 may thereafter notify the USS 120 of this event such that the UTM system 100A may take action to enforce the corresponding directives/constraints. In this fashion, the LCS client 108 bridges location services provided by the 3GPP LCS system 100B with enforcement procedures provided by the UTM system 100A.

Although primarily described in relation to no-fly zones, in some embodiments, the method 500 may be similarly used to indicate aerial highways and altitudes where UAS 102 flight is permitted (e.g., a fly-only zone). For example, the method 500 may similarly function to monitor UASs 102 and determine when the UASs 102 exit a notification area as the notification area is the only area permitted for the UASs 102 to fly. Upon detecting that the UASs 102 have exited this notification area, the UTM system 100A may take action to enforce the corresponding directives/constraints.

Figure 6A:
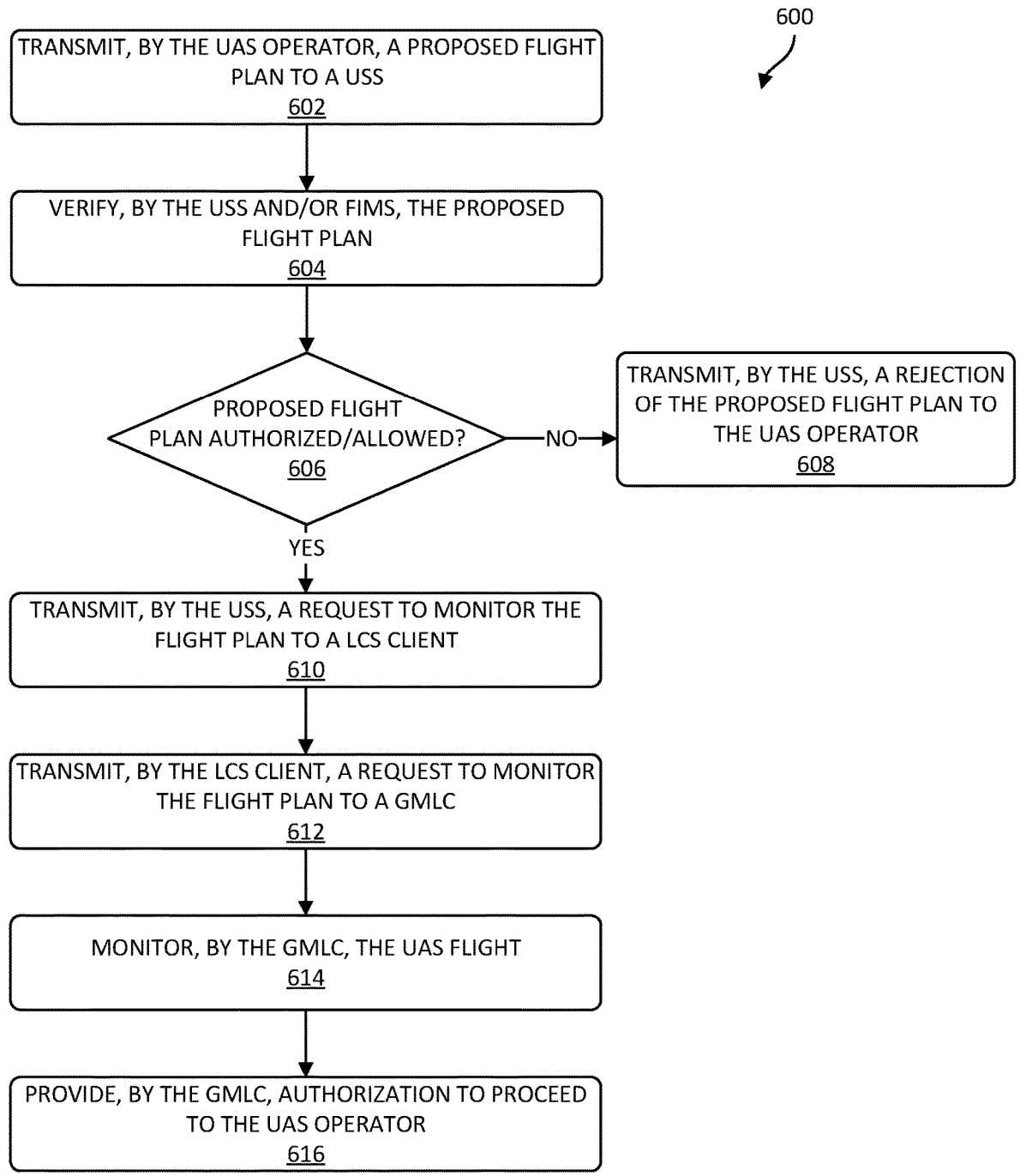
FIG. 6A illustrates a method for authorizing a flight plan for a UAS according to one embodiment.
Figure 6B:
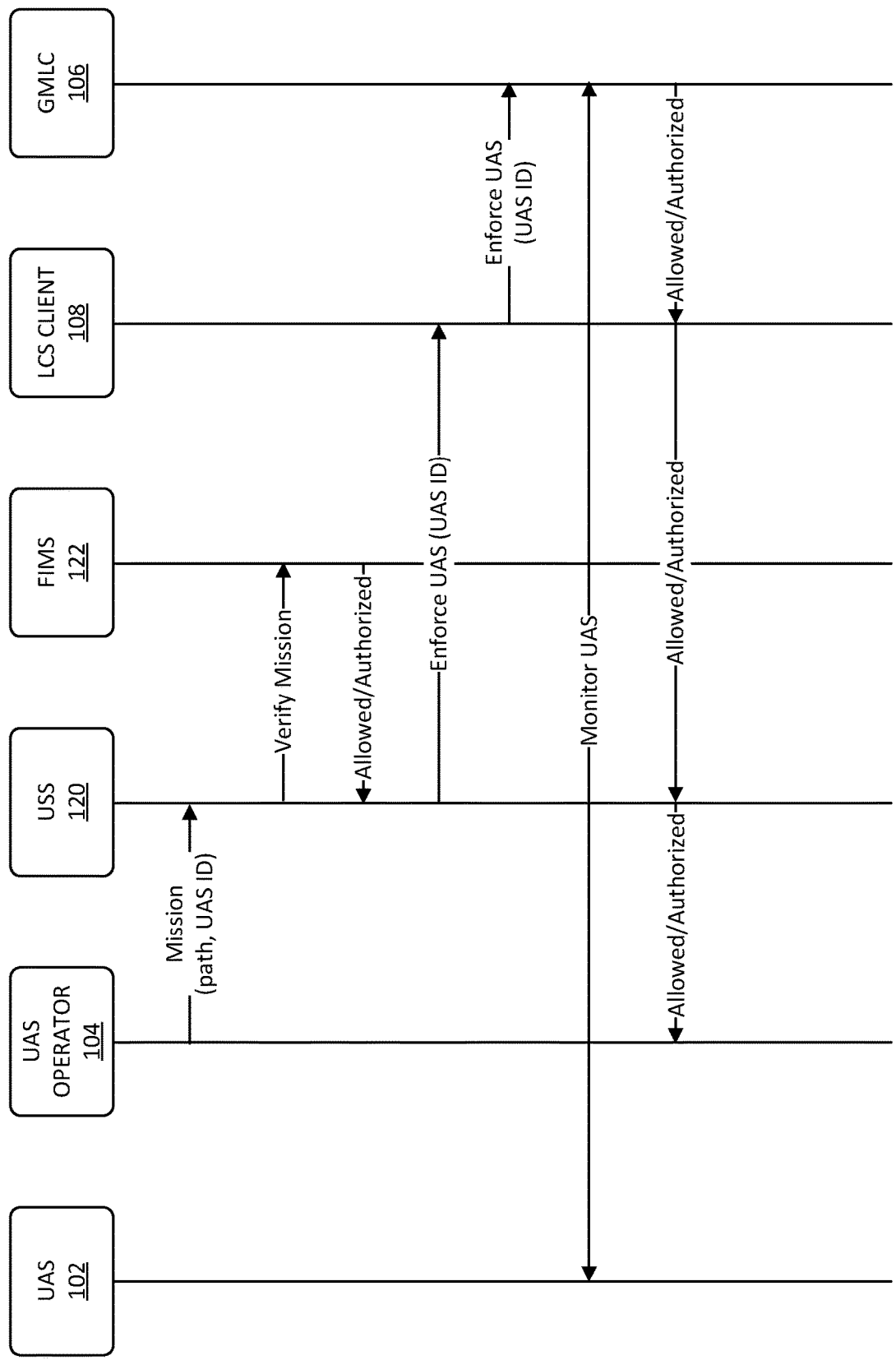
FIG. 6B illustrates an example exchange for authorizing a flight plan for a UAS according to one embodiment.

Turning now to FIG. 6A, a method 600 will be described for authorizing a flight plan for a UAS 102, according to an embodiment. The method 600 may be viewed together with the example exchange according to an embodiment shown in FIG. 6B. The method 600 may commence at operation 602 with transmission of a flight plan from a UAS operator 104 to a USS 120. A proposed flight plan may include one or more of a path (e.g., a starting point, an ending point, and/or a set of waypoints defined by longitudinal and latitudinal coordinates), a set of velocities, a set of altitudes, a heading/direction, a set of events (e.g., capture video at prescribed times or locations, hover over an area for a specified interval, etc.), a time/duration, a set of permitted zones/areas (e.g., fly-only zones), and a set of restricted zones/areas (e.g., no-fly zones). The proposed flight plan may be transmitted from the UAS operator 104 to the USS 120 via any technique, including submission through a web portal. As noted above, in one embodiment, the UAS 102 and/or the UAS operator 104 may provide network subscription information to the USS 120 together with the proposed flight plan. Subscription information may include an operator identifier, a UAS 102 identifier, and/or credentials of the UAS 102. The subscription information allows the UTM system 100A to access location services provided by a GMLC 106 associated with a network operator of a network for which the UAS 102 is a subscriber.

After receiving the proposed flight plan, the USS 120 may attempt to verify that the proposed flight plan does not violate any constraints/directives at operation 604. In one embodiment, the USS 120 may transmit the flight plan to the FIMS 122 to obtain confirmation that the proposed flight plan does not violate any directives/constraints or the USS 120 may process the plan directly based on directives/constraints received from the FIMS 122 and other sources (e.g., the supplemental data service providers 128). Upon determining at operation 606 that the proposed flight plan has been rejected, the USS 120 may transmit a rejection to the UAS operator 104 at operation 608. In some embodiments, the rejection may indicate the reason for rejection (e.g., the proposed flight plan violates a no-fly zone directive/constraint issued by the FIMS 122 or that there is a scheduling conflict). In other embodiments, the proposed flight plan may be adjusted by the USS 120 such that it meets the verification criteria.

Upon determining at operation 606 that the proposed flight plan has been successfully approved/authorized, the USS 120 may transmit a request to monitor/enforce the flight plan to the LCS client 108 at operation 610. The request to monitor/enforce may include one or more of an identifier of the UAS 102 that will be monitored and the authorized flight plan (e.g., an area to monitor). The LCS client 108 may thereafter transmit the request to monitor/enforce the flight plan to a GMLC 106 associated with the UAS 102 at operation 612. As noted previously, the UAS 102 may be associated with a particular network operator via a network. Accordingly, the request to monitor/enforce the flight plan is sent to the GMLC 106 associated with the network operator of the network for which the UAS 102 is a subscriber. In some embodiments, the USS 120 may have received network subscription information associated with the UAS 102. In this embodiment, the USS 120 may provide this information to the LCS client 108 such that the LCS client 108 may establish a connection with an appropriate GMLC 106/network operator such that the LCS client 108 may thereafter transmit the request to monitor/enforce the flight plan over this established connection.

After receipt of the request to monitor/enforce the flight plan for a UAS 102, the GMLC 106 receiving the request may begin monitoring the UAS 102 at operation 614. By monitoring the UAS, the GMLC 106 may ensure that the UAS 102 operates according to the authorized flight plan and that the UAS 102 does not violate any additional directives/constraints that were issued by the UTM system 100A (e.g., constraints/directives issued according to the examples provided in FIGS. 5A and 5B).

After commencing monitoring of the UAS 102, the GMLC 106 may provide authorization for the UAS operator 104 to proceed with the flight plan at operation 616. This authorization may be transmitted from the GMLC 106 to the UAS 102 via the LCS client 108 and the USS 120. Following the authorization to proceed, the UAS operator 104 may begin flying the UAS 102 according to the authorized flight plan. As discussed above, this may involve the UAS operator 104 directly controlling the UAS 102 or various levels of autonomy may be used.

In some embodiments, updates to the flight plan may be issued by the FIMS 122 and/or the USS 120. These updates may be caused by changing airspace conditions and may be forwarded to the UAS operator 104 and a corresponding update may be made via the LCS client 108 to a monitoring plan/schedule performed by the GMLC 106.

Figure 7A:
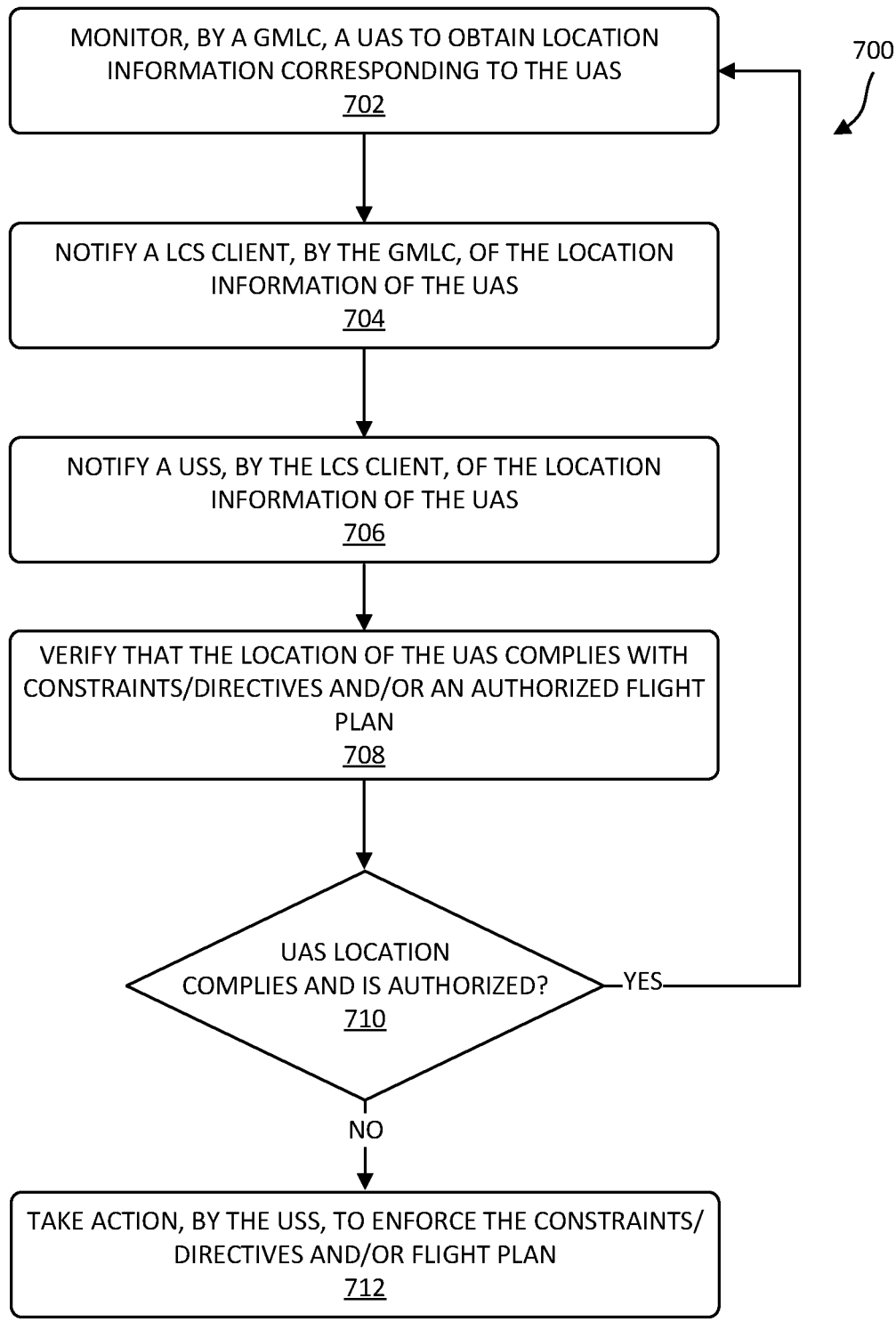
FIG. 7A illustrates a method for enforcing constraints/directives according to one embodiment.

Turning now to FIG. 7A, a method 700, according to an embodiment, for enforcing constraints/directives will be discussed. The method 700 may be viewed together with the example exchange, according to an embodiment, shown in FIG. 7B. The method 700 may commence at operation 702 with a GMLC 106 monitoring a UAS 102 and/or an area of interest. In one embodiment, monitoring the UAS 102 and/or an area of interest may be performed in response to a request to monitor, such as a request described in relation to FIGS. 5A, 5B, 6A, and 6B. Although described in relation to a single UAS 102, in some embodiments, a GMLC 106 may be simultaneously monitoring several of the UASs 102. Monitoring a UAS 102 may include receiving periodic updates on the location of the UAS 102 in an airspace. For example, as the UAS 102 communicates with various network elements associated with the 3GPP LCS system 100B, the GMLC 106 may receive or otherwise determine location information for the UAS 102 via the access networks E-UTRAN 118A, UTRAN 118B, and GERAN 118C. For example, during the course of transmitting data or signaling information via an interface 312C of the UAS 102, the 3GPP LCS system 100B may utilize characteristics of the corresponding signals of the transmission to determine an estimated location of the UAS 102. For instance, with knowledge of a transmission power of the UAS 102 and a Received Signal Strength Indicator (RSSI) and or a signal-to-noise ratio (SNR) corresponding to a received packet, the access networks E-U IRAN 118A, U IRAN 118B, and GERAN 118C may determine the approximate distance between network components and the UAS 102. Based on the known locations of network components via location services information, the location of the UAS 102 may be determined.

At operation 704, the GMLC 106 may notify the LCS client 108 of the location information. The location information may describe the location/point in the airspace being occupied by the UAS 102 and/or motion information of the UAS 102. For example, the location information may include longitude and latitude coordinates describing a point, longitude and latitude coordinates defining an area, altitude, velocity, and direction/heading of a UAS 102. In some embodiments, the location information may include an identifier of the UAS 102 such that the UTM system 100A is aware to which UAS 102 the location information corresponds. This identifier may be related to the subscription information of the UAS 102 or be distinct from the subscription information. The location information may be transmitted at a prescribed interval (e.g., every twenty seconds), upon occurrence of an event (e.g., the location information indicates that the UAS 102 has entered a restricted area of interest or has exited a permitted area of interest), or based on a request originating from the LCS client 108 or originating from another component of the UTM system 100A and routed through the LCS client 108.

Upon receipt of the location information, the LCS client 108 may notify the USS 120 of the location information at operation 706. Notifying by the LCS client 108 may include forwarding the location information or a modified version of the location information to the USS 120. In one embodiment, the LCS client 108 may translate the location information such that the information would be understood by the USS 120. This translation may include moving the location information into a different container format, altering/replacing an identifier of the UAS 102, or any other adjustment such that the location information may be understood by the USS 120.

Figure 7B:
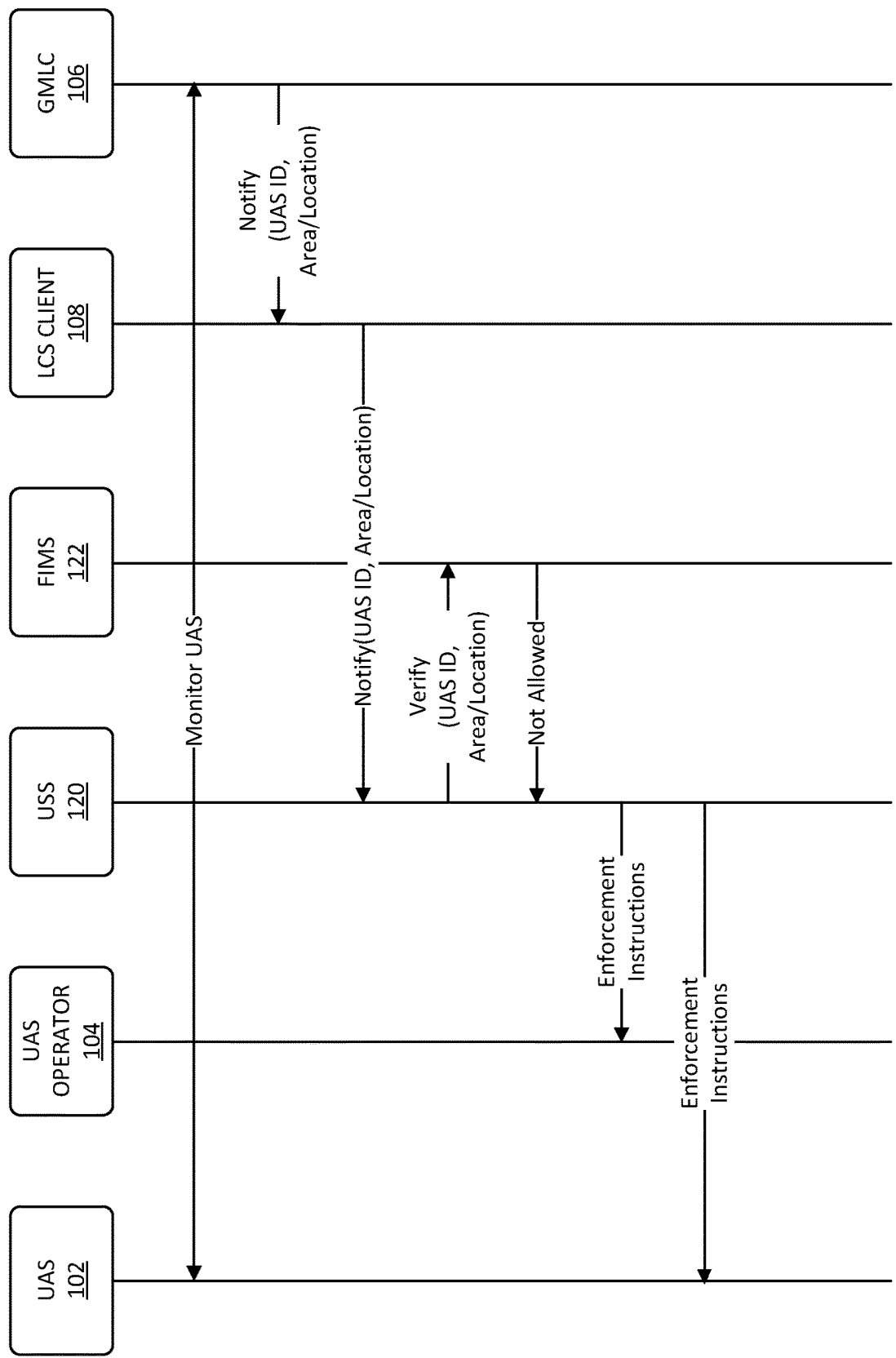
FIG. 7B illustrates an example exchange for enforcing constraints/directives according to one embodiment.

At operation 708 the UTM system 100A may verify that the location information does not violate any directives, constraints, flight plans, or any other rules/requirements. In one embodiment, the FIMS 122 may perform the above described verification as shown in FIG. 7B. In this embodiment, the USS 120 may notify the FIMS 122 of the location information. Notifying the FIMS 122 may include forwarding the location information or a modified version of the location information to the FIMS 122. In one embodiment, the USS 120 may translate the location information such that the information would be understood by the FIMS 122. This translation may include moving the location information into a different container format, altering/replacing an identifier of the UAS 102, or any other adjustment such that the location information may be understood by the FIMS 122.

In some embodiments, the USS 120 may perform the verification in addition to or in lieu of the FIMS 122. The verification performed by the USS 120 allows the USS 120 to consider directives, constraints, or any other rules/requirements provided by sources other than the FIMS 122 (e.g., the supplemental data service providers 128).

When operation 710 determines that the location of the UAS 102, as indicated by the location information, is authorized (e.g., does not violate any directives, constraints, flight plans, or any other rules/requirements), the method 700 may return to operation 702 to continue monitoring the UAS 102. Conversely, when operation 710 determines that the location of the UAS 102 is not authorized (e.g., violates a directive, constraint, flight plan, or any other rule/requirement), operation 712 may cause the UTM system 100A to take action to enforce the violated directive, constraint, flight plan, or any other rule/requirement.

Enforcement may be performed using various techniques. In one embodiment, the USS 120 may transmit a warning to the UAS operator 104 corresponding to the UAS 102 that is determined to be violating a directive, constraint, flight plan, or any other rule/requirement. The warning may be issued to an electronic device associated with the UAS operator 104 (e.g., an email or a text message on a computing device associated with the UAS operator 104 and/or the UAS 102). The warning may identify the offending UAS 102, the violation, and possible or required remedial steps. In addition, or in another embodiment, the USS 120 may transmit a command to the UAS 102 to cause the UAS 102 to take a remedial step at operation 712. For example, the USS 120 may send a command to the UAS 102 to cause the UAS 102 to immediately land at a prescribed landing zone, change altitude, or navigate to a permitted area. As shown in FIG. 7B, the USS 120 may send a command to take a remedial step to both the UAS 102 and the UAS operator 104. However, in other embodiments, the USS 120 may send a command to take a remedial step to only one of the UAS 102 and the UAS operator 104. The above described commands may cause the UAS 102 to take action to correct the violation without interaction with or from a UAS operator 104.

Although described herein as taking remedial action when location information indicates that a UAS 102 is in violation of a constraint, directive, or flight plan, in some embodiments the UTM system 100A may take corrective action with assistance from the 3GPP LCS system 100B to correct other failures. For example, up detecting that the connection 134 (e.g., a command and control (C2) connection) between the UAS operator 104 and the UAS 102 is no longer active (e.g., the UAS 102 is out-of-range of the UAS operator 104), the UTM system 100A may determine the location of the UAS 102 via the 3GPP LCS system 100B and take remedial action. In this scenario, the remedial action may be one or more of (1) the UTM system 100A navigating the UAS 102 home or to another safe landing location using a connection separate from the connection 134 and based on the determined location of the UAS 102; (2) the UTM system 100A transmitting a message to the UAS operator 104 to inform the UAS operator 104 of the issue and the location of the UAS 102; and (3) sending a warning message to all UASs 102 proximate to the current location of the UAS 102 in distress, which may cause the other UASs 102 to move out of the area to avoid collision. Accordingly, as described above, the UTM system 100A make utilize location services provided by the 3GPP LCS system 100B to mitigate not just the UAS 102 violating a directive/constraint, but also other issues related to operation of the UAS 102.

As described herein, the UTM system 100A may utilize location information provided by the 3GPP LCS system 100B. This enables the UTM system 100A to enforce UAS 102 locations in real time without relying on the coordinate reporting from UAS operators 104 or USSs 120. In this way, the USS 120 or the FIMS 122 do not need to provide resources to track all UASs 102 and the location reported for each UAS 102 can be trusted as it is reported by a standardized, regulated, and reliable entity (e.g., the network operator). Accordingly, the mechanisms described herein provide a new value added service that the network operators can provide the UTM system 100A and which can be priced according to the resources required to provide it. Further, as the LCS client 108 can be used to enquire about locations of UASs 102, this allows the UTM system 100A to provide new services. For example, although the description has primarily focused on enforcement of flight plans, location services can be utilized in relation to providing notifications to multiple UASs 102 in certain geographical locations. This may be used for providing warnings or other information to the proximate UASs 102.

Each element of the air traffic system 100 may be composed of or otherwise implemented by a set of computing/networking devices. For example, FIG. 8, illustrates a computing/networking device 800 according to one embodiment. As shown the computing/networking device 800 may include a processor 802 communicatively coupled to a memory 804 and an interface 806. The processor 802 may be a microprocessor, controller, microcontroller, central processing unit, digital signal processor, application specific integrated circuit, field programmable gate array, any other type of electronic circuitry, or any combination of one or more of the preceding. The processor 802 may comprise one or more processor cores. In particular embodiments, some or all of the functionality described herein as being provided by a component of the air traffic system 100 may be implemented by one or more processors 802 of one or more computing/networking devices 800 executing software instructions, either alone or in conjunction with other computing/networking devices 800 components, such as the memory 804.

The memory 804 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 804 may comprise non-volatile memory containing code to be executed by the processor 802. Where the memory 804 is non-volatile, the code and/or data stored therein can persist even when the computing/networking device 800 is turned off (when power is removed). In some instances, while the computing/networking device 800 is turned on, that part of the code that is to be executed by the processor(s) 802 may be copied from non-volatile memory into volatile memory (e.g., dynamic random access memory (DRAM), static random access memory (SRAM)) of the computing/networking device 800.

The interface 806 may be used in the wired and/or wireless communication of signaling and/or data to or from computing/networking device 800. For example, interface 806 may perform any formatting, coding, or translating to allow computing/networking device 800 to send and receive data whether over a wired and/or a wireless connection. In some embodiments, the interface 806 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 808 to the appropriate recipient(s). In some embodiments, interface 806 may comprise network interface controller(s) (NICs), also known as a network interface card, network adapter, local area network (LAN) adapter or physical network interface. The NIC(s) may facilitate in connecting the computing/networking device 800 to other devices allowing them to communicate via wire through plugging in a cable to a physical port connected to a NIC. In particular embodiments, the processor 802 may represent part of the interface 806, and some or all of the functionality described as being provided by the interface 806 may be provided in part or in whole by the processor 802.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing an unmanned aerial vehicle (UAV), comprising:
   transmitting a first request to monitor a location of the UAV and a location of an operator of the UAV to a first location services system provided by a first network operator that provides location information of the UAV based on wireless communications of the UAV in a first network operated by the first network operator, wherein the first request to monitor the location of the UAV indicates an area of interest;
   receiving, from the first location services system, a first message that indicates a current location of the UAV and of the operator of the UAV as a result of the first location services system detecting the UAV in the area of interest;
   determining geographical characteristics of an area between the operator of the UAV and the UAV; and
   in response to receiving the first message and determining the geographical characteristics of the area between the operator of the UAV and the UAV, causing one or more remedial actions to be performed responsive to receipt of the first message when detected that the operator of the UAV has failed to maintain visual line of sight with the UAV.

2. The method of claim 1, wherein the first message includes an identifier of the UAV and information describing the area of interest.

3. The method of claim 1, further comprising:
   wherein prior to transmitting the first request, receiving an indication of the area of interest, wherein the area of interest is one of an area in which the UAV is not permitted and a flight plan in which the UAV is authorized to fly.

4. The method of claim 3, further comprising:
   verifying that the flight plan complies with a set of directives and constraints issued by a regulatory authority.

5. The method of claim 4, wherein transmitting the first request is performed in response to successfully verifying that the flight plan complies with the set of directives and constraints.

6. The method of claim 1, further comprising:
   receiving subscriber information associated with the UAV and the first network; and
   establishing a connection with the first location services system based on the subscriber information,
   wherein the first request and the first message are transmitted through the connection.

7. The method of claim 1, wherein the first network is one of a cellular network and a wireless local area network.

8. The method of claim 1, wherein the first network is a 3rd Generation Partnership Project (3GPP) network and the first message originated from a Gateway Mobile Location Center (GMLC) of the 3GPP network.

9. The method of claim 1, wherein the one or more remedial actions include transmitting a second request to land the UAV and transmitting a third request to modify the current location of the UAV.

10. A non-transitory computer-readable storage medium storing instructions which, when executed by a set of one or more processors of a computing device, cause the computing device to manage an unmanned aerial vehicle (UAV):
 transmit a first request to monitor a location of the UAV and a location of an operator of the UAV to a first location services system provided by a first network operator that provides location information of the UAV based on wireless communications of the UAV in a first network operated by the first network operator, wherein the first request to monitor the location of the UAV indicates an area of interest;
 receive, from the first location services system, a first message that indicates a current location of the UAV and of the operator of the UAV as a result of the first location services system detecting the UAV in the area of interest;
 determine geographical characteristics of an area between the operator of the UAV and the UAV; and
 in response to receipt of the first message and determination of the geographical characteristics of the area between the operator of the UAV and the UAV, cause one or more remedial actions to be performed responsive to receipt of the first message when detected that the operator of the UAV has failed to maintain visual line of sight with the UAV.

11. The non-transitory computer-readable storage medium of claim 10, wherein the first message includes an identifier of the UAV and information describing the area of interest.

12. The non-transitory computer-readable storage medium of claim 10, wherein the instructions which, when executed by the set of one or more processors of a computing device, further cause the computing device to:
 prior to transmitting the first request, receive an indication of the area of interest, wherein the area of interest is one of an area in which the UAV is not permitted and a flight plan in which the UAV is authorized to fly; and
 verify that the flight plan complies with a set of directives and constraints issued by a regulatory authority.

13. The non-transitory computer-readable storage medium of claim 12, wherein transmitting the first request is performed in response to successfully verifying that the flight plan complies with the set of directives and constraints.

14. The non-transitory computer-readable storage medium of claim 10, wherein the instructions which, when executed by the set of one or more processors of a computing device, further cause the computing device to:
 receive subscriber information associated with the UAV and the first network; and
 establish a connection with the first location services system based on the subscriber information,
 wherein the first request and the first message are transmitted through the connection.

15. The non-transitory computer-readable storage medium of claim 10, wherein the first network is a 3rd Generation Partnership Project (3GPP) network and the first message originated from a Gateway Mobile Location Center (GMLC) of the 3GPP network.

16. The non-transitory computer-readable storage medium of claim 10, wherein the one or more remedial actions include transmitting a second request to land the UAV and transmitting a third request to modify the current location of the UAV.

17. A network device for managing an unmanned aerial vehicle (UAV), comprising:
 a processor;
 a memory coupled to the processor, wherein the memory includes one or more instructions that when executed by the processor cause the network device to:
  transmit a first request to monitor a location of the UAV and a location of an operator of the UAV to a location services system provided by a network operator that provides location information of the UAV based on wireless communications of the UAV in a network operated by the network operator, wherein the first request to monitor the location of the UAV indicates an area of interest;
  receive, from the location services system, a message that indicates a current location of the UAV and of the operator of the UAV as a result of the location services system detecting the UAV in the area of interest;
  determine geographical characteristics of an area between the operator of the UAV and the UAV; and
  in response to receipt of the first message and determination of the geographical characteristics of the area between the operator of the UAV and the UAV, cause one or more remedial actions to be performed responsive to receipt of the message when detected that the operator of the UAV has failed to maintain visual line of sight with the UAV.

18. The network device of claim 17, wherein the one or more remedial actions include transmitting a second request to land the UAV and transmitting a third request to modify the current location of the UAV.

* * * * *